(12) United States Patent
Boys et al.

(10) Patent No.: US 10,325,717 B2
(45) Date of Patent: Jun. 18, 2019

(54) ROADWAY POWERED ELECTRIC VEHICLE SYSTEM

(75) Inventors: John Talbot Boys, Auckland (NZ); Grant Anthony Covic, Auckland (NZ)

(73) Assignee: Auckland Uniservices Limited, Auckland (NZ)

(*) Notice: Subject to any disclaimer, the term of this patent is extended or adjusted under 35 U.S.C. 154(b) by 83 days.

(21) Appl. No.: 13/389,210

(22) PCT Filed: Aug. 6, 2010

(86) PCT No.: PCT/NZ2010/000159
§ 371 (c)(1),
(2), (4) Date: Apr. 25, 2012

(87) PCT Pub. No.: WO2011/016736
PCT Pub. Date: Feb. 10, 2011

(65) Prior Publication Data
US 2012/0217111 A1 Aug. 30, 2012

Related U.S. Application Data

(60) Provisional application No. 61/273,701, filed on Aug. 7, 2009.

(51) Int. Cl.
*B60L 11/18* (2006.01)
*H01F 38/14* (2006.01)
(Continued)

(52) U.S. Cl.
CPC .............. *H01F 38/14* (2013.01); *B60L 53/12* (2019.02); *H02J 7/025* (2013.01); *H02J 50/12* (2016.02);
(Continued)

(58) Field of Classification Search
CPC ............ H02J 5/025; H02J 7/025; H02J 50/12; H02J 50/40; H02J 50/70; H02J 50/80;
(Continued)

(56) References Cited

U.S. PATENT DOCUMENTS

| 4,331,225 A | 5/1982 | Bolger |
| 4,836,344 A | 6/1989 | Bolger |

(Continued)

FOREIGN PATENT DOCUMENTS

| CN | 1595765 | 3/2005 |
| CN | 1281436 | 10/2006 |

(Continued)

OTHER PUBLICATIONS

U.S. Appl. No. 13/389,090 filed Feb. 6, 2012.
(Continued)

*Primary Examiner* — Zachary L Kuhfuss
(74) *Attorney, Agent, or Firm* — Law Office of Richard F. Jaworski, PC

(57) ABSTRACT

A roadway powered electric vehicle system includes a power supply (101) which makes power available inductively to one or more modules (111) provided in or under a roadway. Modules (111) make a magnetic field selectively available to one or more vehicles travelling over the roadway corresponding to the location of the vehicle. The presence or strength of the magnetic field provided on the roadway may be dependent upon the vehicle type or category.

32 Claims, 31 Drawing Sheets

(51) Int. Cl.
*H02J 50/80* (2016.01)
*H02J 50/90* (2016.01)
*H02J 50/70* (2016.01)
*H02J 7/02* (2016.01)
*H02J 50/40* (2016.01)
*H02J 50/12* (2016.01)
*B60L 53/12* (2019.01)
*H02J 5/00* (2016.01)

(52) U.S. Cl.
CPC .............. *H02J 50/40* (2016.02); *H02J 50/70* (2016.02); *H02J 50/80* (2016.02); *H02J 50/90* (2016.02); *B60L 2200/26* (2013.01); *H02J 5/005* (2013.01); *Y02T 10/7072* (2013.01); *Y02T 90/122* (2013.01); *Y02T 90/14* (2013.01)

(58) Field of Classification Search
CPC .... H02J 50/90; B60L 11/182; Y02T 10/7072; Y02T 90/14; Y02T 90/122; H01F 38/14
USPC .............................................. 191/10, 14, 15
See application file for complete search history.

(56) References Cited

U.S. PATENT DOCUMENTS

| | | | |
|---|---|---|---|
| 5,207,304 A | 5/1993 | Lechner et al. | |
| 5,293,308 A | 3/1994 | Boys et al. | |
| 5,311,973 A | 5/1994 | Tseng et al. | |
| 5,573,090 A | 11/1996 | Ross | |
| 5,821,728 A | 10/1998 | Schwind | |
| 6,317,338 B1 | 11/2001 | Boys | |
| 6,879,889 B2 | 4/2005 | Ross | |
| 7,212,414 B2* | 5/2007 | Baarman | 363/16 |
| 8,030,888 B2 | 10/2011 | Pandya et al. | |
| 2001/0012208 A1* | 8/2001 | Boys | 363/23 |
| 2009/0129126 A1* | 5/2009 | Boys | 363/37 |
| 2012/0119698 A1 | 5/2012 | Karalis et al. | |

FOREIGN PATENT DOCUMENTS

| | | |
|---|---|---|
| JP | 2-133101 | 11/1990 |
| JP | 2-133102 | 11/1990 |
| JP | 7-61350 | 3/1995 |
| JP | 7-67206 | 3/1995 |
| JP | 7-170612 | 7/1995 |
| JP | 2002359902 | 12/2002 |
| JP | 200642519 | 2/2006 |
| JP | 2006529079 | 12/2006 |
| JP | 2007501600 | 1/2007 |
| JP | 2008109839 | 5/2008 |
| JP | 2009164293 | 7/2009 |
| JP | 4778432 | 7/2011 |
| WO | WO9850993 | 11/1998 |
| WO | WO9908359 | 2/1999 |
| WO | WO2006118474 | 11/2006 |
| WO | WO2007090168 | 8/2007 |
| WO | WO2008140333 | 11/2008 |

OTHER PUBLICATIONS

New U.S. Patent Application entitled Inductive Power Transfer System filed concurrently herewith.

Michael L.G. Kissin et al., Interphase Mutual Inductance in Polyphase Inductive Power Transfer Systems, IEEE Transactions of Industrial Electronics, vol. 56, No. 7, pp. 2393-2400 Jul. 2009.

Grant A. Covic et al., A Three-Phase Inductive Power Transfer System for Roadway-Powered Vehicles, IEEE Transactions of Industrial Electronics, vol. 54, No. 6, pp. 3370-3378, Dec. 2007.

Doron Kwiat et al., Calculation of the Mutual Induction Between Coplanar Circular Surface Coils in Magnetic Resonance Imaging, IEEE Transactions on Biomedical Engineering, vol. 39, No. 5, pp. 433-436, May 1992.

\* cited by examiner

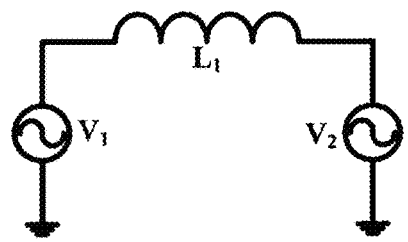
Figure 3: Power Transfer diagram
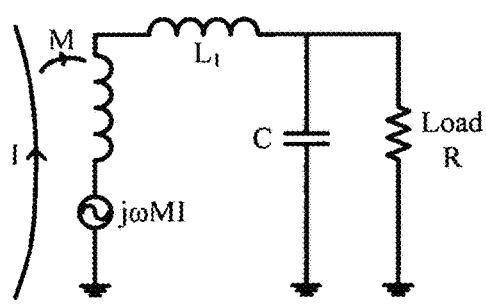
Figure 4: IPT pick-up diagram
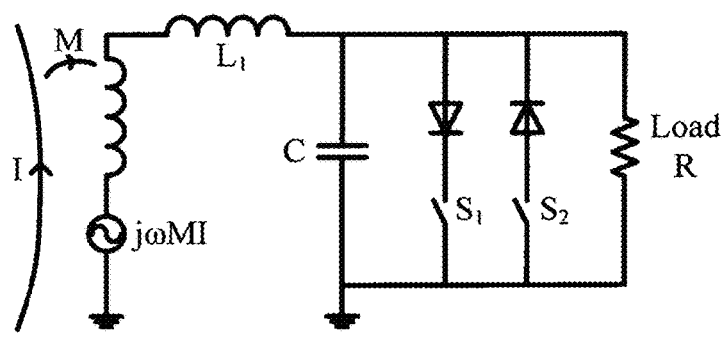
Figure 5: Forced-phase controller using two switches

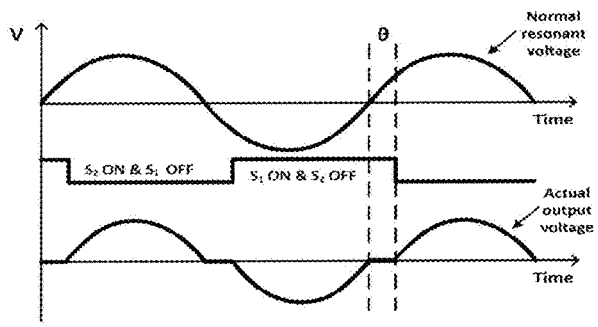
Figure 6: Phase shifting by controlled switching
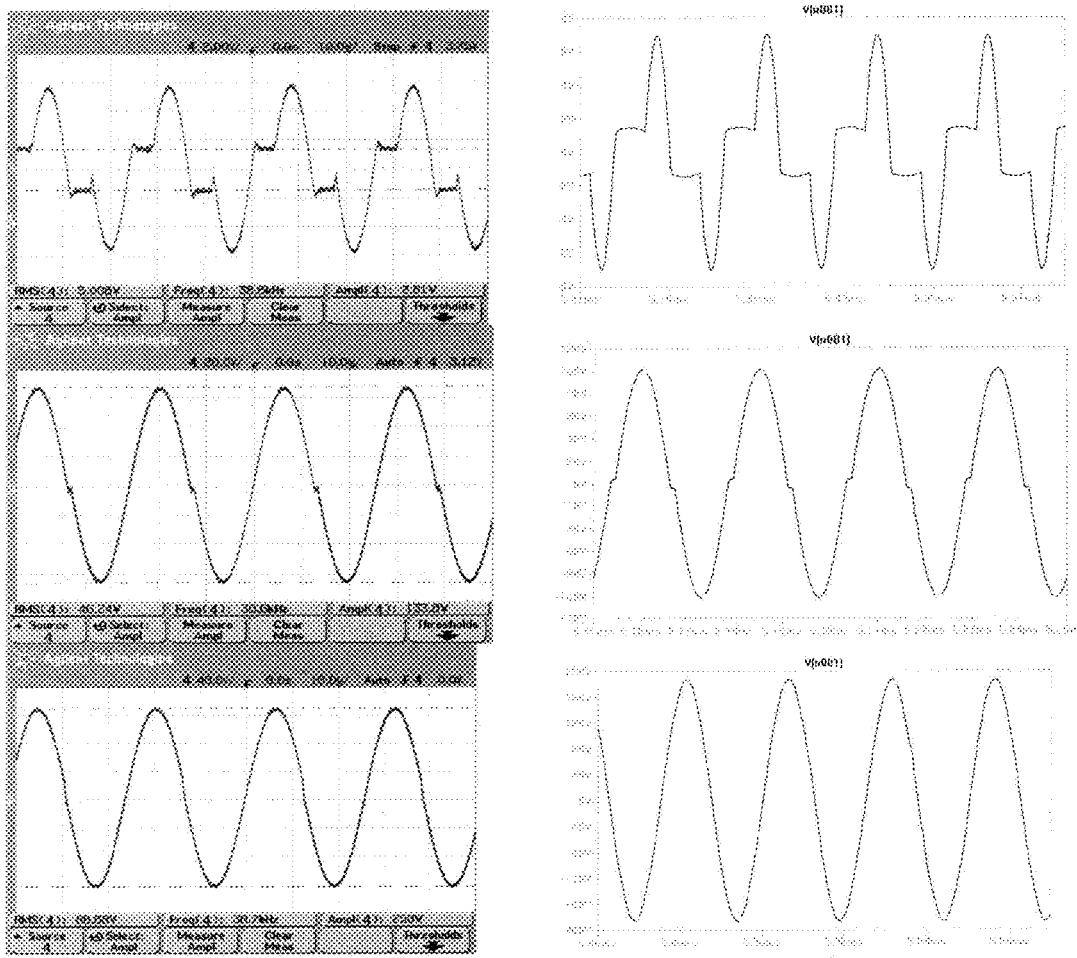
Figure 7: measured waveforms (left) and simulated waveforms (right)
Upper - low Q, Middle - medium Q, Lower – high Q

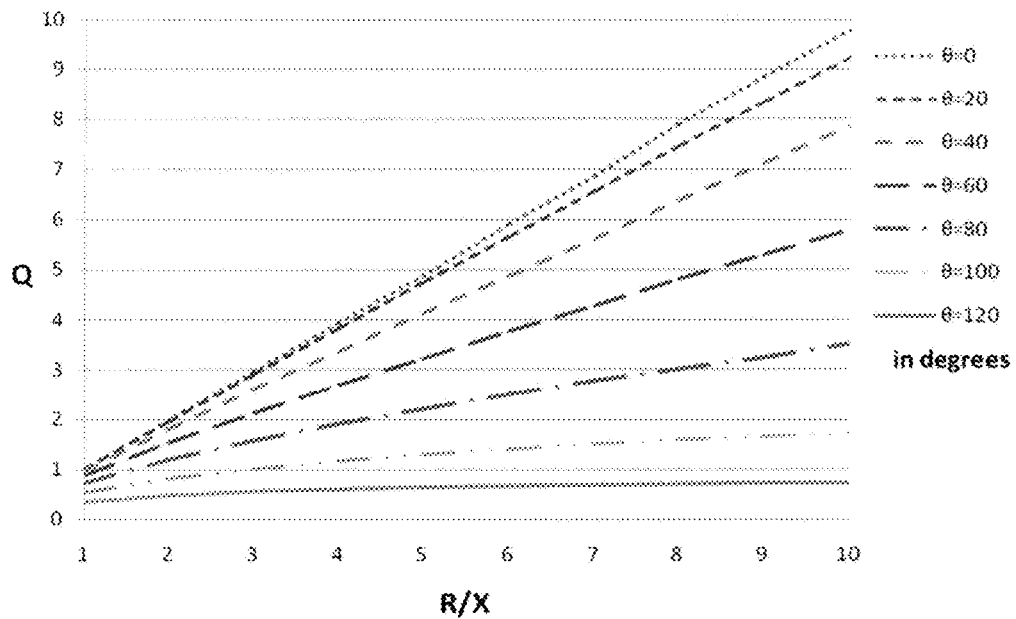
Figure 8: The observable Q (Output voltage divided by induced voltage = $\frac{V_2}{V_1}$) for a range of θ and normalized load resistance. Note X is the reactance of the pick-up coil.
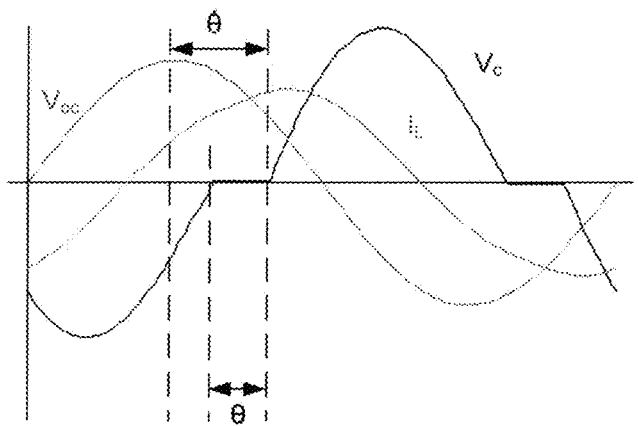
Figure 9: The definition of the possible control angles θ and θ´. In practice the ideal control angle θ´ cannot be observed but θ can always be observed.

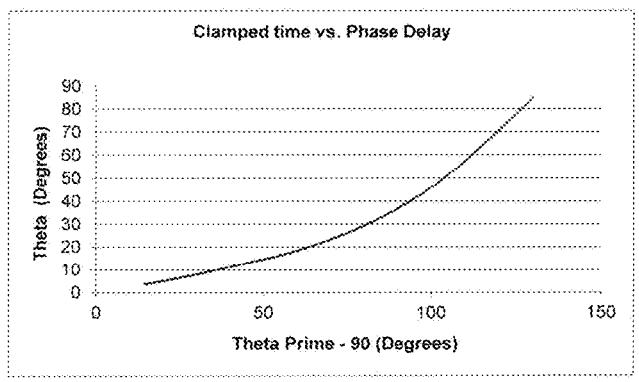
Fig. 10. The relationship between θ and θ′ for a circuit with a Q of 5. Other Q values give a very similar result. If θ′ is known then θ is uniquely determined.
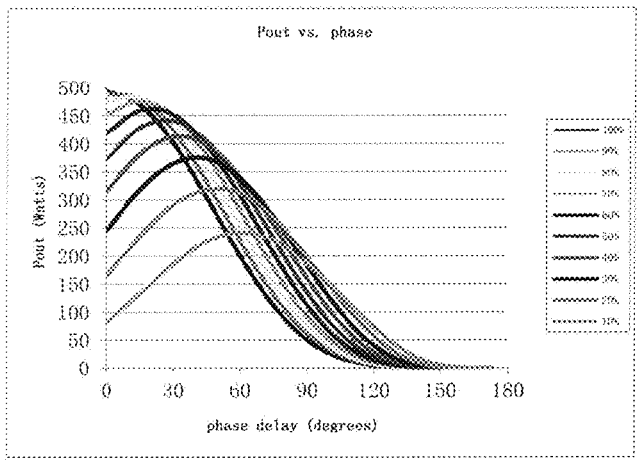
Fig. 11. The variation in output power for different tuning capacitors as a % of the ideal tuning capacitor.
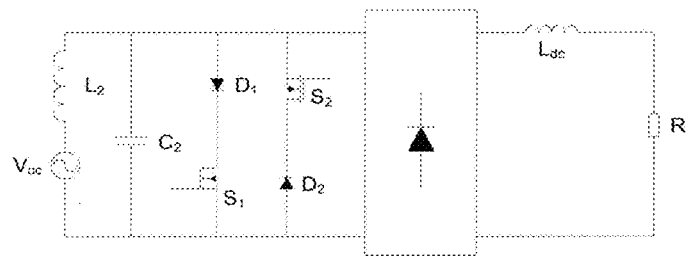
Fig. 12. A practical implementation of the circuit of Figure 5 with a DC rectifier to convert to a DC output.

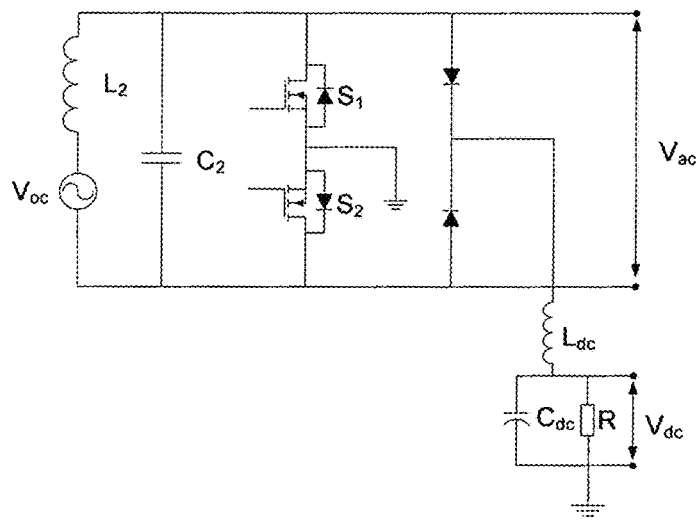
Fig. 13. A practical implementation of the circuit of Figure 5 circuit minimising the component count and providing both an AC and a DC output. This circuit uses exactly the same number of components as the AC only circuit of Figure 5.
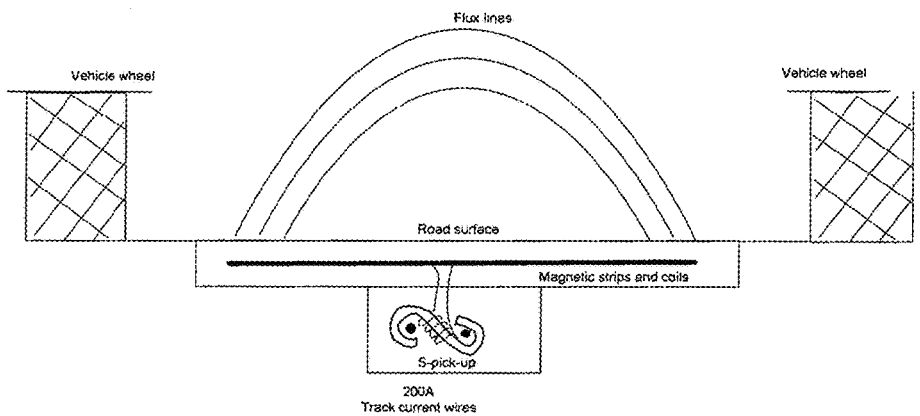
Figure 14

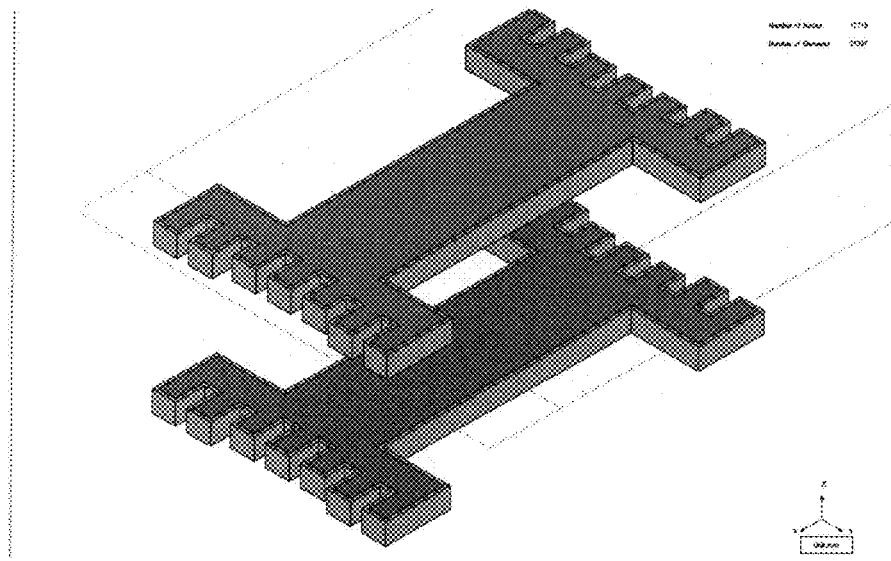
Figure 21: arrangement of ferrite in a Flux-pipe pick-up system
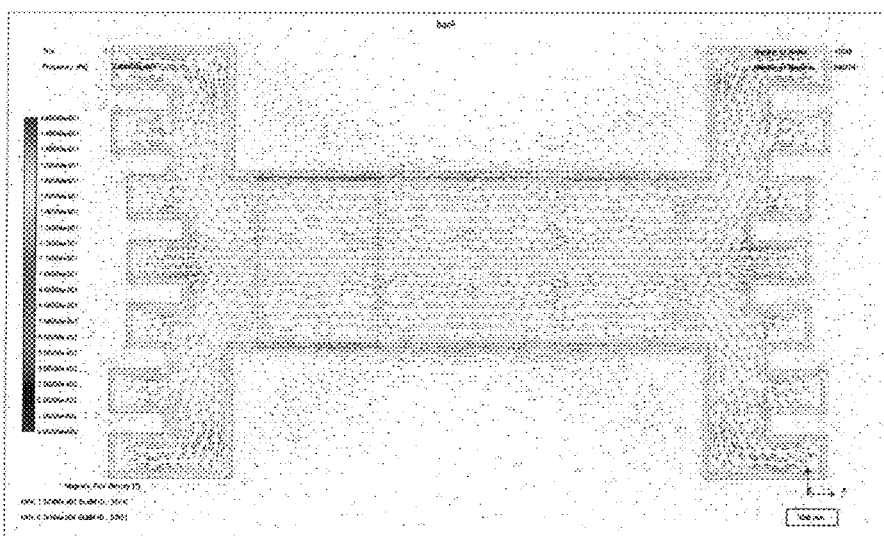
Figure 22: Computer generated flux plots in a pick-up pad with 25 A current in the windings. XY Plane z is half-way through the ferrite.

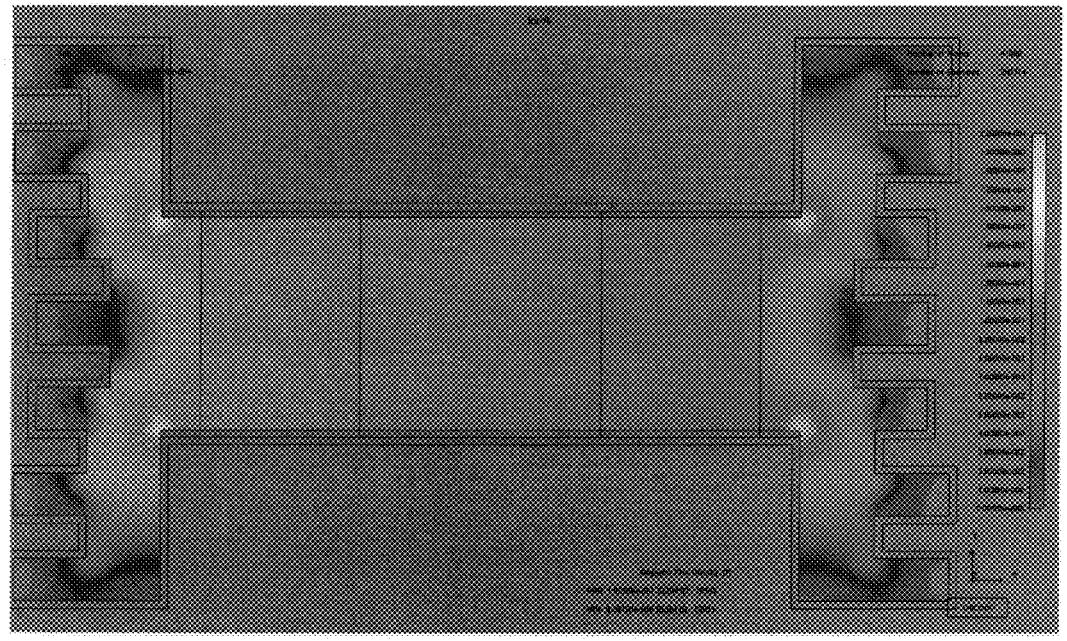
Figure 23: Flux density in the ferrite
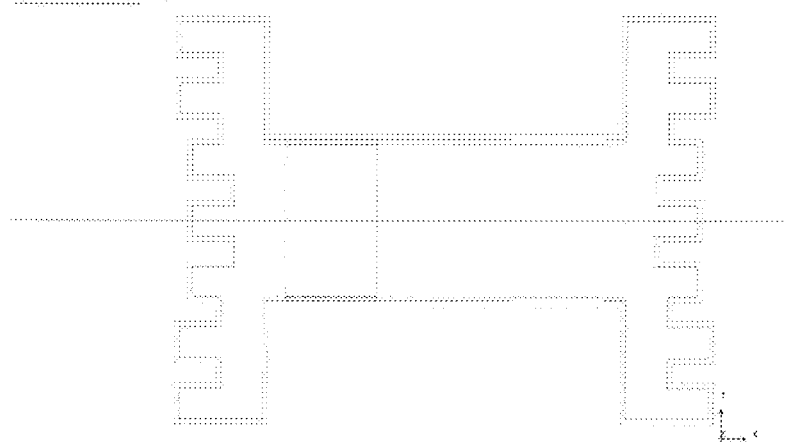
Figure 24: Cut plane for flux plots of coupled pads

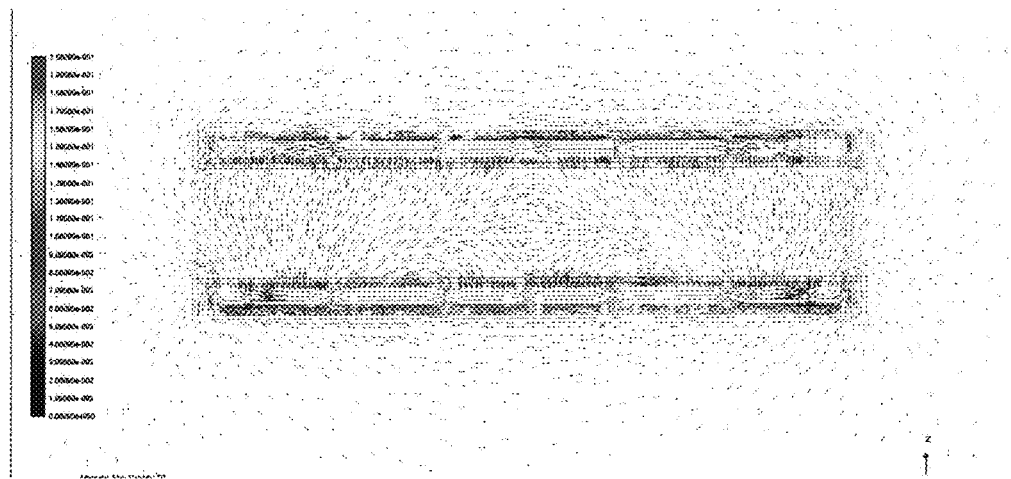
Figure 25: Flux lines at 100 mm separation
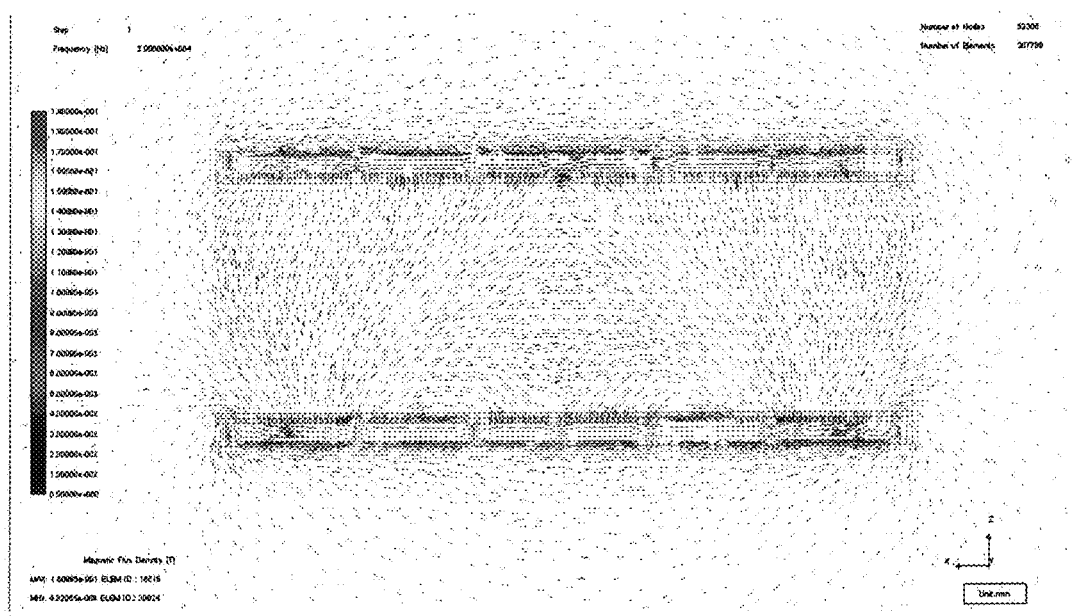
Figure 26: Flux lines at 200 mm separation

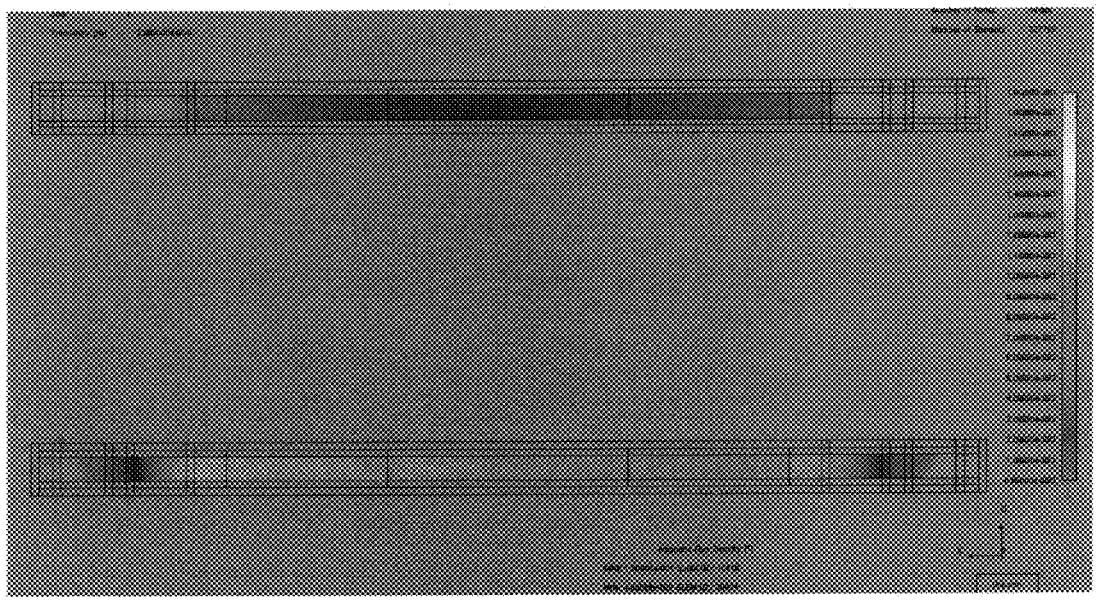
Figure 27: Flux Density in a coupled system with 200 mm spacing, secondary open circuited.

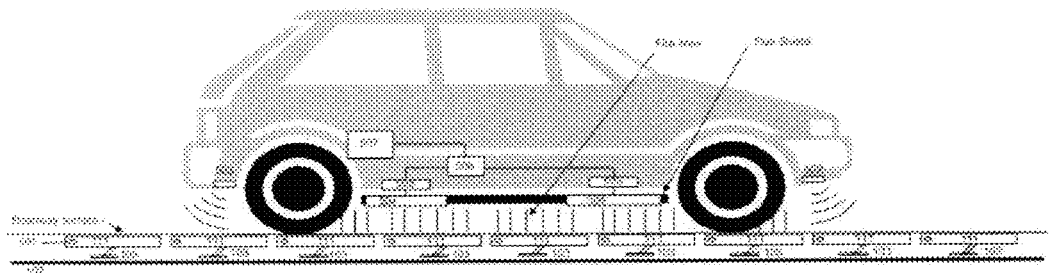
Figure 36 Conceptual roadway system and vehicle
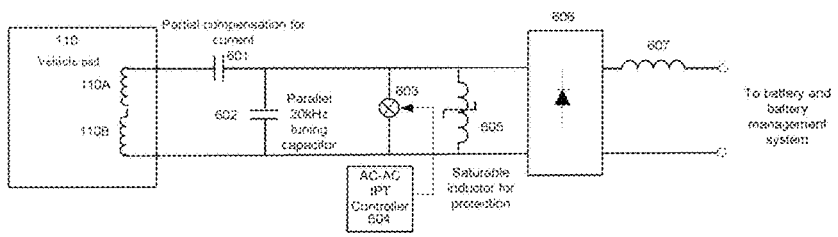
Figure 37A
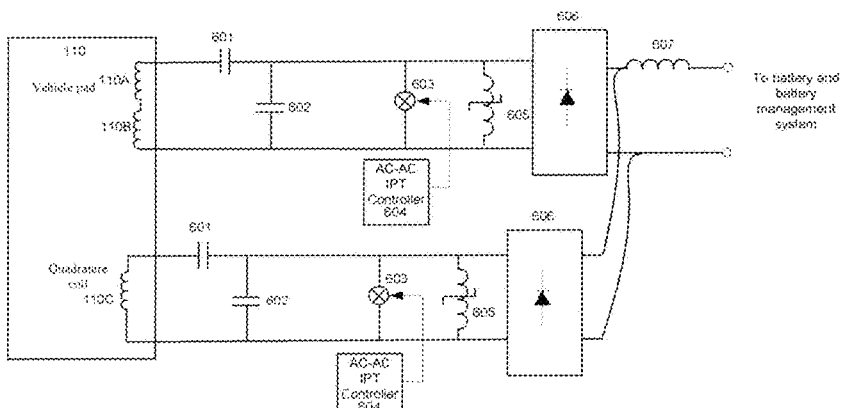
Figure 37B

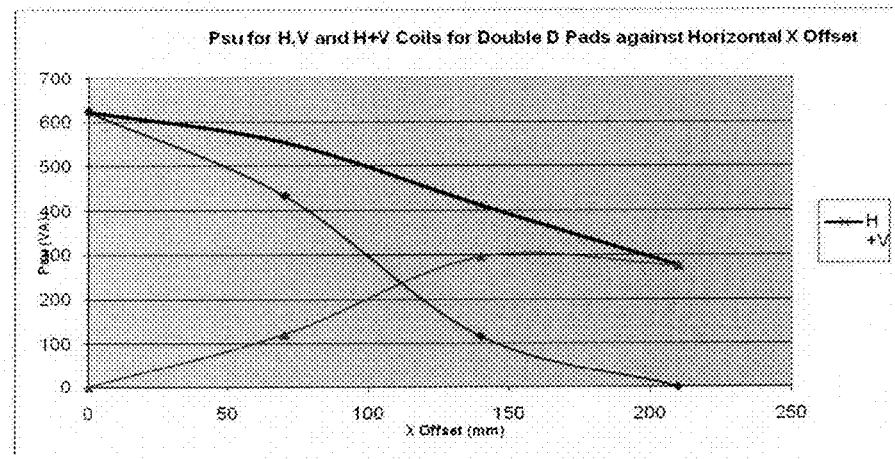
Figure 38A Uncompensated output power of flat coils (blue) output of quadrature coil (green), combined output (black) showing improved tolerance from centre line.
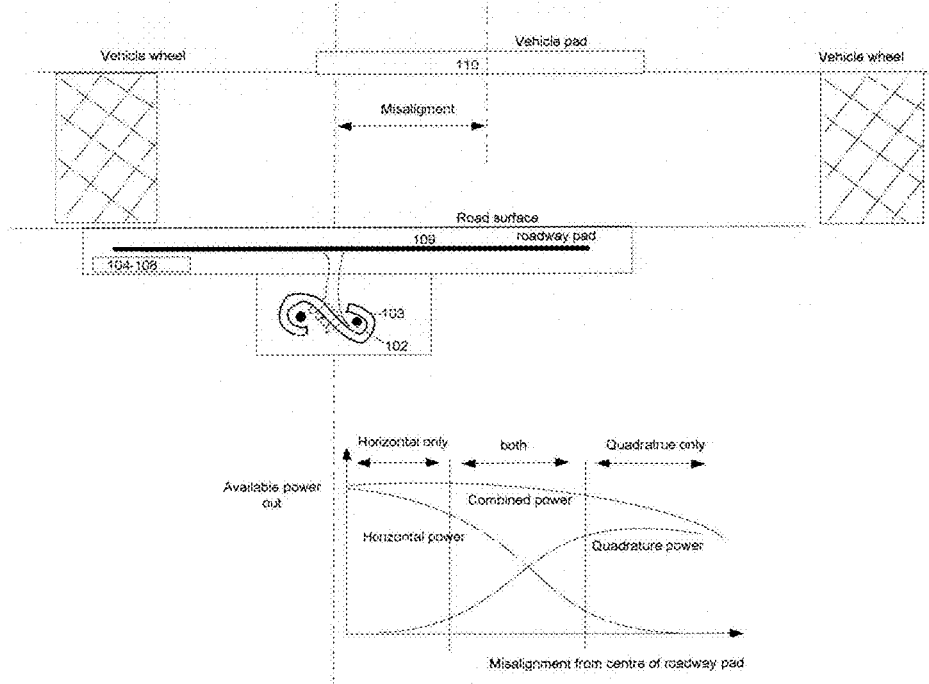
Figure 38B Conceptual power out with misalignment

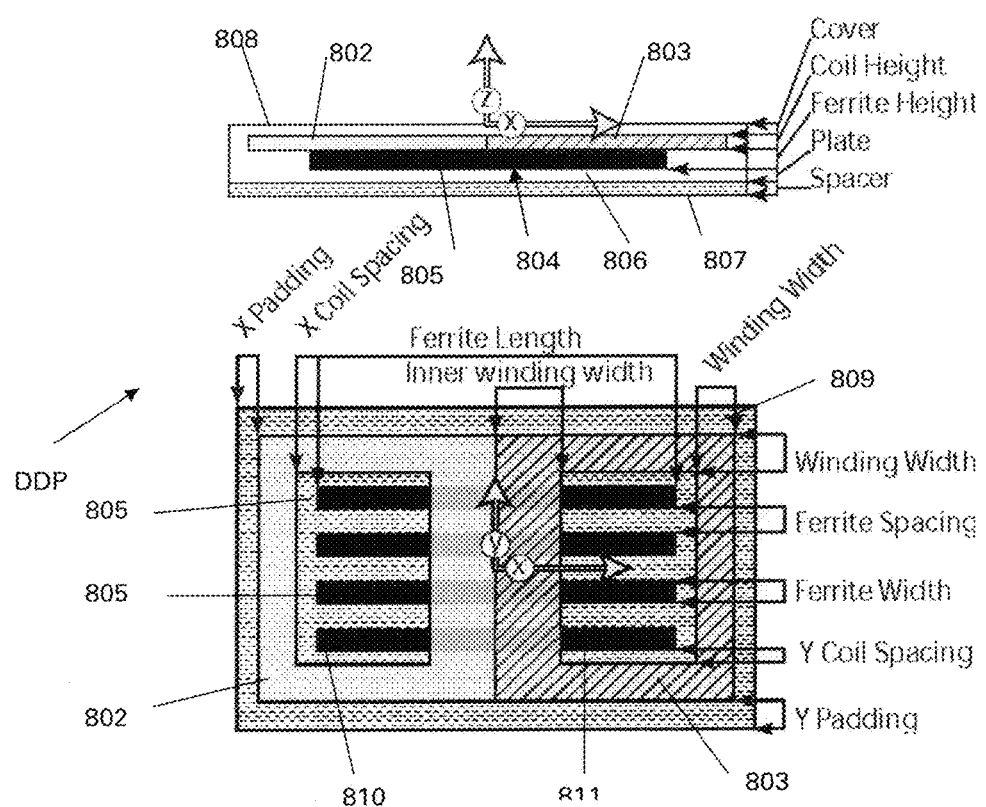
Figure 40: The DDP pad seen from the side (top) and from above (bottom).

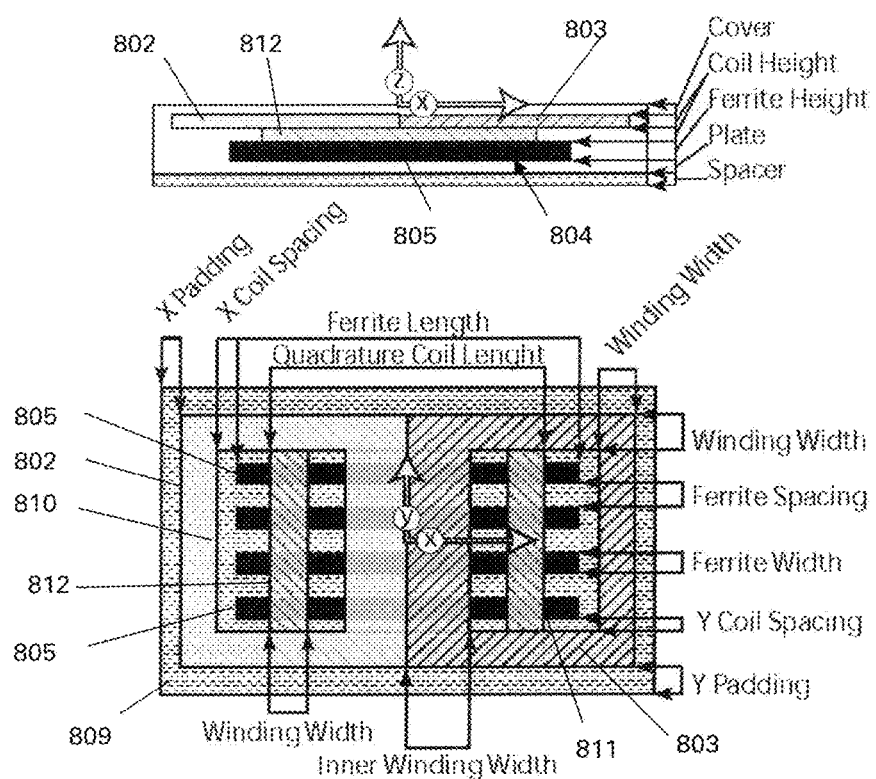
Figure 41: The double D quadrature pad seen from the side (top) and from above (bottom).

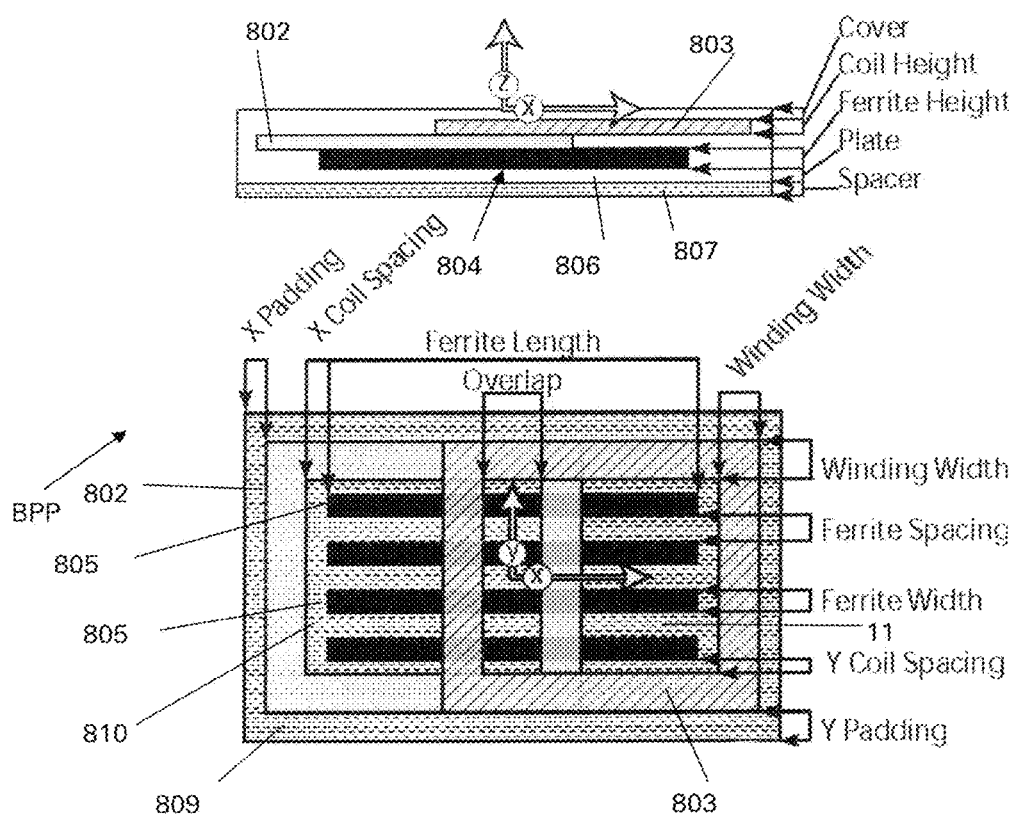
Figure 42: The bipolar pad seen from the side (top) and from above (bottom).

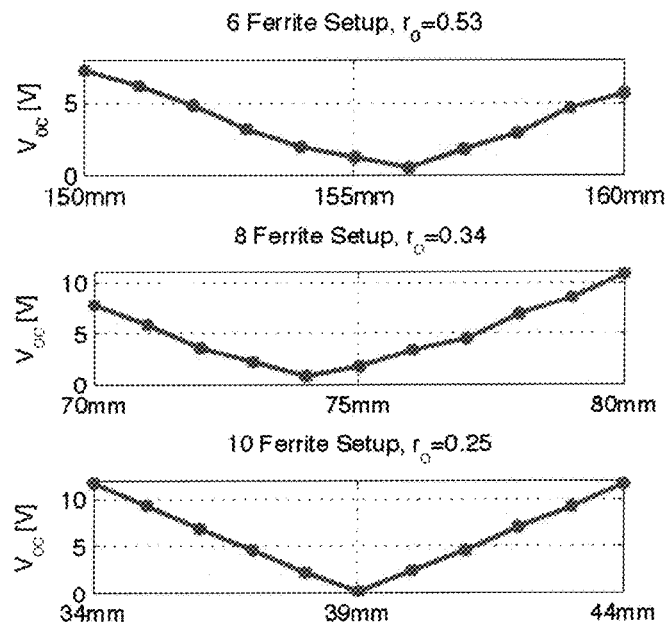
Figure 43: Open circuit voltage coupled in the second BPP coil as a function of overlap when the first coil is energised.
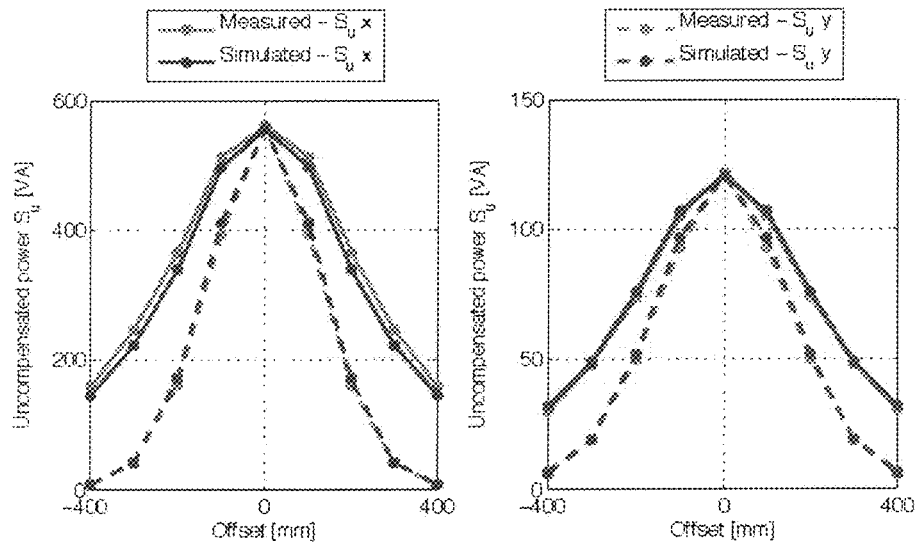
Figure 44: Measured and simulated power of a BPP with ten turns in each coil using six ferrite slabs to construct each of the ferrite strips in the base. Vertical displacements are 150 mm in the left column, and 250 mm in the right column.

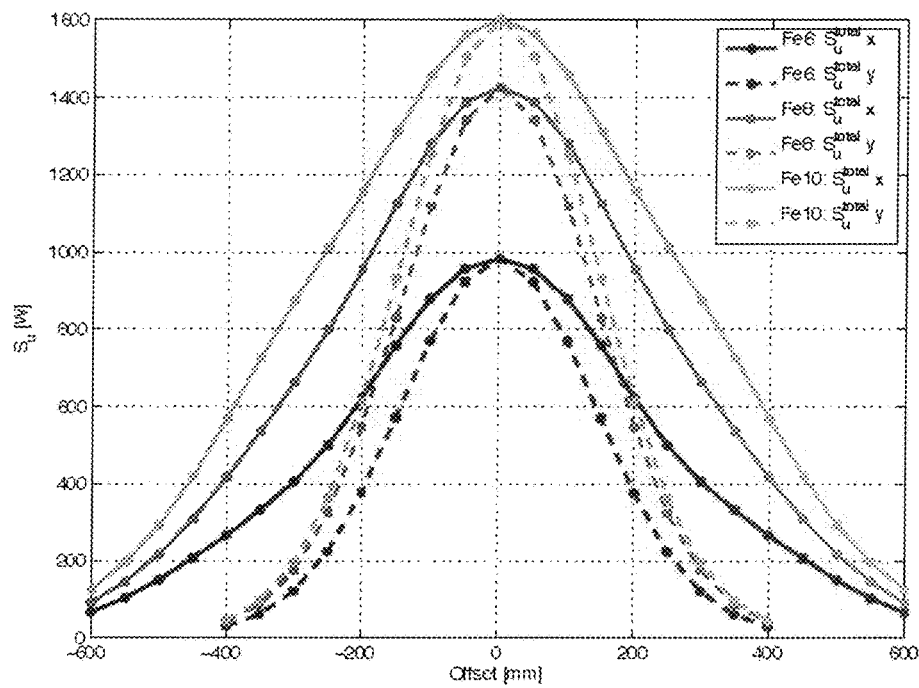
Figure 45: Uncompensated power for the three BPP setups with the pickup offset either in the x or y direction at 200 mm vertical separation

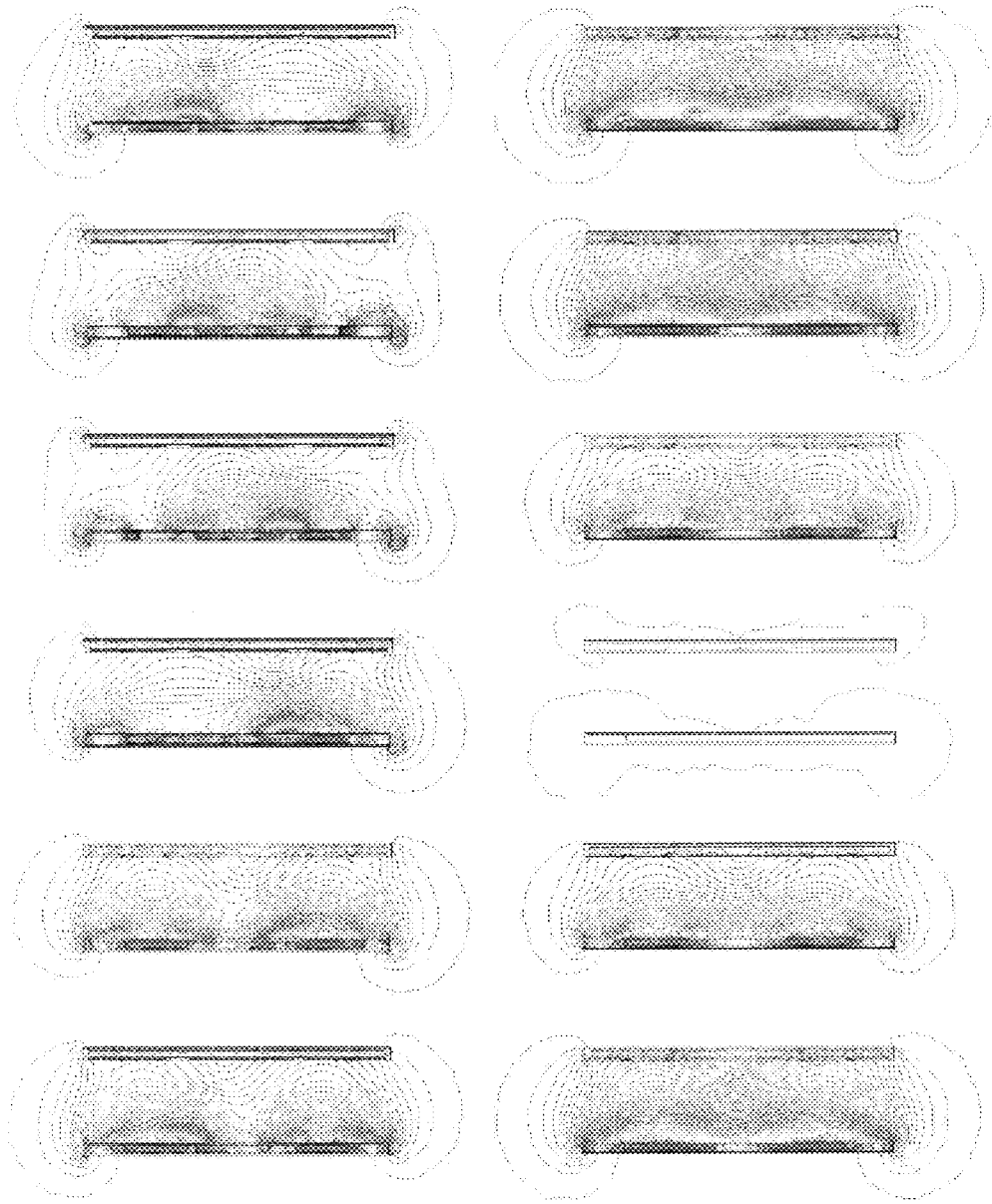
Figure 46: Field plots of both the BPP8 and DDP coupling to a DDQP receiver, at various instances in time over a full cycle of the primary resonant current. From top to bottom shows 0, 30, 60, 90, 120 and 150 degrees (where in the bipolar the other phase is operated with 90 degree separation). Left Column: BPP with 8 ferrites, Right Column: DDP

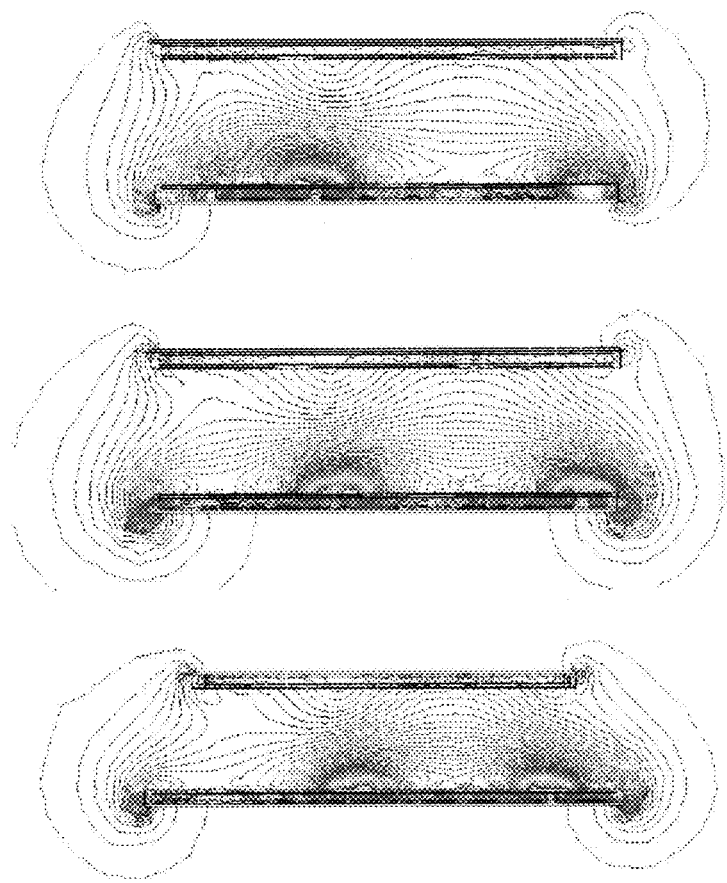
Figure 47: BPP with six (top), eight (middle) and ten (bottom) slabs making up each ferrite strip in the base, in the presence of a vertical offset DDQP pick-up at 0 degrees

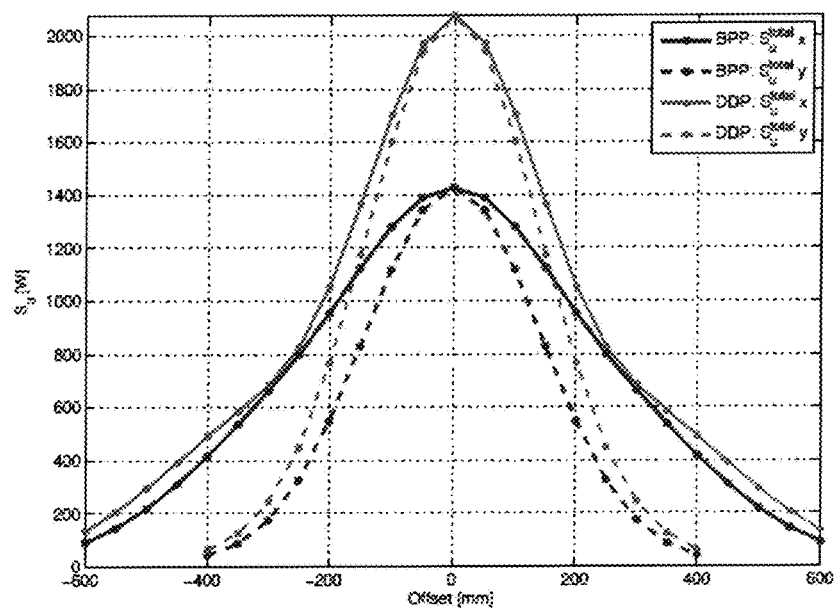
Figure 48: An example power transfer profile of a BPP(8) with a DDQP receiver

ROADWAY POWERED ELECTRIC VEHICLE SYSTEM

The present application is based on and claims the benefit of International Application Number PCT/NZ2010/000159 filed on Aug. 6, 2010, which claims priority from U.S. Provisional Application Ser. No. 61/273,701 filed Aug. 7, 2009 and is identified as a continuation-in-part of Provisional Application Ser. No. 61/273,701 in the International Publication (WO2011/016736) of International Application Number PCT/NZ2010/000159, the entire contents of each of which are herein incorporated by reference.

FIELD OF THE INVENTION

This invention relates to systems for inductive power transfer to electric vehicles. The invention has particular application to powering electric vehicles from a vehicle surface such as a roadway over which the vehicles travel.

BACKGROUND

The problem of providing power inductively to moving vehicles along a roadway has been discussed for many years, to overcome the range anxiety associated with pure electric vehicles (EVs) i.e. electric vehicles which rely solely on electric energy. The ability to provide power continuously, or at least sufficiently often, while the vehicle is travelling has many benefits. These include: minimisation of on-board energy storage and vehicle weight; and elimination of the long charging times required when available power sources are dispersed and only used when an EV's power supply is low.

Charging or powering electric vehicles inductively from a roadway has been proposed previously in paper publications. The solutions proposed for providing a roadway powered electric vehicle (RPEV) system discuss means by which small sections of roadway include embedded inductive loops which may be energised when a vehicle requiring charge is determined to be in the proximity. This eliminates the need to power large sections of highway and increases the efficiency of the system. In all cases a number of inductive loops are spaced along a highway but they are directly connected to a power supply typically operating at frequencies between 1-10 kHz. Each inductive loop is selectively energised by direct switching means when a vehicle is detected to be in the proximity. Inductive receivers on-board the vehicle are elongated in the direction of the highway and normally controlled to be in close proximity with the roadway when the vehicle is moving.

For example, U.S. Pat. Nos. 4,331,225 and 4,836,344 describe means by which an electrochemical battery may be charged as a vehicle travels along an inductive highway. In U.S. Pat. No. 4,836,344 controllable relays are used to switch on and off sections of highway transmitter modules of around 3 m in length to deliver power to a vehicle as it moves along the roadway surface. The inductive roadway modules are elongate, being oriented longitudinally in the direction of the roadway, and placed end to end along the centre of the roadway. Power control to the vehicle is enacted from the roadway side simply by temporarily switching off the roadway power modules as required. U.S. Pat. No. 4,331,225 by the same author describes means by which the desired vehicle receiver is lowered to ensure the air-gap between the vehicle pick-up receiver and the roadway inductive track is as small as possible during operation, while capacitor switching means is also employed to modify the pick-up tuning to compensate (and thereby regulate the output voltage of the compensated receiving coil) for any reluctance variations during driving.

In U.S. Pat. No. 5,207,304, Lechner describes improvements to the magnetic structure of both the roadway transmitter coils and the receiver on board the vehicle. U and W shaped magnetic cores are suggested. Variable switchable compensation capacitors are described to enable power control and regulation to a battery In U.S. Pat. No. 5,311,973, Tseng describes the addition of radio communications to control the switching of the primary coils and sensors to help guide the vehicle along the inductive loops. Further information relating to means by which specific vehicle recognition and billing is also described.

U.S. Pat. No. 5,821,728 describes a system that combines many of the above elements from earlier patent publications. Again the system requires the pick-up receiver on the vehicle to be lowered to take power from a roadway with inductive coupling strips along the centreline of the road.

In U.S. Pat. No. 6,879,889 a fast charging system is proposed that relies on a rapid charge energy storage device such as an electromechanical battery (EMB). As a result clusters of inductive transmitter modules (each with a single elongated flat pancake coil of roughly 3 m by 65 cm) placed longitudinally along the roadway centre are proposed that only need to be installed in less than 10% of the highway. To be effective these power transmitters require relatively high charging rates (a minimum power transfer of 100 kW-140 kW delivered continuously to an EV while it is in motion above the transmitter modules). In order to improve coupling between the roadway transmitter modules and the receiver coils while the EV is in motion along the highway an adjustable ride-height suspension and alignment is suggested. For garaging and/or stops along the roadside/at lights or other convenient places, the high charging rates require the pick-up to be lowered to near zero air-gap. Parking is assumed to be within 100 mm laterally but a mechanism for adjusting the receiving coil to within 10-20 mm in the lateral direction is proposed. Under such stationary charging there are suggested means for heating the road to ensure a build up of snow or ice does not stop the pick-up lowering mechanism from operating correctly. The scheme requires heating elements embedded in the road which each can take as much as 10% of the delivered power. Communications means for data and billing are also described.

OBJECT

It is an object of the invention to provide an improved roadway powered electric vehicle system, or a vehicle or roadway for use with such a system. Alternatively it is an object to provide a useful alternative to previous roadway powered electric vehicle proposals.

BRIEF SUMMARY OF THE INVENTION

In the present specification solutions are described for an RPEV system in which power is inductively coupled from the roadway to moving vehicles using either single phase transmitter modules spaced along the highway, or small sections of multi-phase tracks. The described systems overcome or at least ameliorate many of the aforementioned problems while offering improved safety features. They also allow controllable charging to the battery provided on-board the vehicle without relying on communications between the vehicle and a roadside power controller. There is no need to lower the pick-up power receiver on-board the vehicle while the EV is moving along the roadway or when it is stationary, for example at traffic lights or parked in a garage. Furthermore, the problem of efficient power transfer without significantly compromising driving performance and freedom of lateral movement along a roadway driving lane is also addressed. System efficiency is maximised using sensors to detect the presende and general type or category of vehicle, and roadway sections are only energised underneath a vehicle as required. The power delivered to each vehicle can be varied to suit each vehicle's need, by active control embedded in the roadway.

Therefore in one aspect the disclosure provides an electric vehicle inductive power system comprising:

a primary conductive path associated with a vehicle surface,
a plurality of power transmission modules in or on the roadway inductively coupled to the primary conductive path, the or each power transmission module being capable of supplying power inductively to at least one electric vehicle when the vehicle is on the vehicle surface in the region of that power transmission module.

The vehicle surface may comprise a roadway.

In one embodiments the primary conductive path is energised at a first frequency and the power transmission modules are energised at a second frequency. The second frequency may be greater than the first frequency.

A controller may be provided for each power transmission module to selectively allow each module to make inductive power available to a vehicle when the vehicle is sufficiently near the module to receive power therefrom. In one embodiment the controller controls the quantity of power available to the vehicle.

The power available may be determined based on a power demand category of a vehicle to which power is being supplied or on the type of vehicle to which power is being supplied, or dependent on the number of vehicles on a section of vehicle surface.

One or more coils are preferably provided in each power transmission module to provide a magnetic field for inductive power transfer to a vehicle.

In one embodiment the power transmission modules are tuned so that the section of the primary conductive path adjacent to each module has its reactance substantially compensated.

The primary conductive path may be buried in or adjacent to the vehicle surface.

In another aspect the disclosure provides an electric vehicle inductive power system comprising: a plurality of power transmission modules in or on a vehicle surface, each power transmission module being capable of supplying power inductively to at least one electric vehicle when the vehicle is on the vehicle surface in the region of that power transmission module, a controller to selectively allow each module to make inductive power available to a vehicle when the vehicle is sufficiently near the module to receive power therefrom and energise adjacent modules in phase.

In yet another aspect the disclosure provides an electric vehicle inductive power system comprising:

a plurality of power transmission modules in or on a vehicle surface, each power transmission module being capable of supplying power inductively to at least one electric vehicle when the vehicle is on the vehicle surface in the region of that power transmission module,
a controller to allow each module to vary the quantity of inductive power made available to a vehicle when the vehicle is sufficiently near the module to receive power therefrom.

In another aspect the disclosure provides a power transmission module for an electric vehicle inductive power system comprising a plurality of coils adapted to be energised in a phase relationship to provide a magnetic field.

In another aspect the disclosure provides a roadway unit for a electric vehicle inductive power system, the unit comprising an upper surface, at least one coil of electrically conductive material beneath the upper surface and configured in use to provide a magnetic field extending above the upper surface, and a connection means for receiving power to energise the coil.

In one aspect the disclosure provides a roadway powered electric vehicle system comprising: a roadway controller for receiving an indication of one of a plurality of vehicle categories of a vehicle on a roadway and selectively providing a magnetic field at a location on the roadway corresponding to the location of the vehicle, the presence or strength of the magnetic field being dependent on the vehicle category.

In one embodiment the vehicle category may comprise a non-electric vehicle in which case the controller does not provide a magnetic field for the vehicle.

In some embodiments vehicles are categorised according to inherent electric power demand. Accordingly, a non-electric vehicle has a zero power demand, a small electric vehicle has a low power demand and a large electric vehicle has a high power demand.

In one embodiment a sensor is provided in or adjacent to the roadway to detect the vehicle category. The sensor may be provided at a predetermined location so that the controller may use the sensor to also detect the location of the vehicle to thereby make power available at the vehicle location. The sensor may comprise a power transmission module.

In one embodiment the sensor comprises a receiver, such as an RFID receiver.

In another aspect the disclosure provides a roadway powered electric vehicle comprising:

an inductive power receiver module capable of receiving power from a magnetic field provided above the surface of a roadway,
a vehicle category identifier capable of providing an indication of a power demand category of vehicle to a power supply controller associated with the roadway.

In another aspect the disclosure provides a roadway powered electric vehicle system comprising:

a roadway having a plurality of inductive power transmission modules,
each module having a module width which extends across at least a part of the width of the roadway and, a module length which extends in the direction of the roadway, the width being greater than or equal to the length.

In another aspect the disclosure provides a roadway powered electric vehicle system comprising:

a roadway having a plurality of inductive power transmission modules,
each module comprising at least two substantially planar coils arranged side by side and extending away from each other towards opposite sides of the roadway.

In one embodiment the coils also extend longitudinally along the roadway.

In one embodiment the coils may extend substantially across the width of the roadway (i.e. in the transverse direction). The coils may extend further in the longitudinal direction than the transverse direction, or may extend in the longitudinal direction to an extent that is less than or equal to their extent in the transverse direction.

In another aspect the disclosure provides a roadway powered electric vehicle comprising:

an inductive power receiver module capable of receiving power from a magnetic field provided above the surface of a roadway, the receiver module having a module width which extends across at least a part of the width of the vehicle and a module length which extends in the direction of the longitudinal dimension of the vehicle, the module width being greater than or equal to the module length.

In another aspect the disclosure provides a roadway powered electric vehicle comprising:

an inductive power receiver module capable of receiving power from a magnetic field provided above the surface of a roadway, the receiver module comprising at least two substantially planar coils arranged side by side and extending away from each other towards opposite sides of the vehicle.

In another aspect the disclosure provides a roadway powered electric vehicle system comprising:

a roadway having a plurality of inductive power transmission modules, each module having a module width which extends across at least a part of the width of the roadway and a module length which extends in the direction of the roadway, the width being less than or equal to the length.

In another aspect the disclosure provides a roadway powered electric vehicle system comprising:

a roadway having a plurality of inductive power transmission modules, each module comprising at least two substantially planar coils arranged side by side and extending away from each other longitudinally along the roadway.

In another aspect the disclosure provides a roadway powered electric vehicle comprising:

an inductive power receiver module capable of receiving power from a magnetic field provided above the surface of a roadway, the receiver module having a module width which extends across at least a part of the width of the vehicle and a module length which extends in the direction of the longitudinal dimension of the vehicle, the module width, being less than or equal to the module length.

In another aspect the disclosure provides a roadway powered electric vehicle comprising:

an inductive power receiver module capable of receiving power from a magnetic field provided above the surface of a roadway, the receiver module comprising at least two substantially planar coils arranged side by side and extending away from each other towards opposite sides of the vehicle.

In one embodiment the coils also extend towards opposite ends of the vehicle.

In one embodiment the coils may extend substantially across the width of the vehicle (i.e. in the transverse direction). The coils may extend further in the longitudinal direction than the transverse direction, or may extend in the longitudinal direction to an extent that is less than or equal to their extent in the transverse direction.

In another aspect the disclosure provides a roadway powered electric vehicle comprising:

an inductive power receiver module capable of receiving power from a magnetic field provided above the surface of a roadway, the receiver module comprising at least two substantially planar coils arranged side by side and a third coil overlapping the other coils.

In one embodiment the third coil is connected in quadrature with the other coils.

In another aspect the disclosure provides a roadway powered electric vehicle comprising:

an inductive power receiver module capable of receiving power from a magnetic field provided above the surface of a roadway, the receiver module comprising two coils connected in parallel and in opposite phase, and a quadrature coil.

In another aspect the disclosed subject matter provides an inductive power transmission module for a roadway powered electric vehicle system, the module comprising:

a coil of electrically conductive material arranged to produce a magnetic field, and a controller to control the current in the coil to thereby control the magnetic field.

In one embodiment the module includes a receiver coil to receive power from another magnetic field.

In another aspect the disclosed subject matter provides a roadway powered electric vehicle system comprising:

an elongate primary conductive loop associated with a roadway;

a plurality of power transmission modules in the roadway inductively coupled to the primary conductive path, the or each power transmission module being capable of supplying power inductively to one or more electric vehicles when the one or more vehicles is on the roadway in the region of that power transmission module.

In one embodiment a controller is provided for each power transmission module to selectively allow each module to make inductive power available to a vehicle when the vehicle is sufficiently near the module to receive power therefrom.

In one embodiment the controller controls the quantity of power available to the vehicle. The power available may be determined based on the power demand category or type of vehicle to which power is being supplied.

In one embodiment the controller controls the quantity of power available to each vehicle dependent on the number of vehicles on a section of roadway, or dependent on a combination or vehicle power demand category and the number of vehicles on the section of roadway.

In one embodiment one or more coils are provided in each power transmission module to provide a magnetic field for inductive power transfer to a vehicle.

In one embodiment the power transmission modules are tuned so that the section of the primary conductive path adjacent to each module has its reactance substantially compensated.

In another aspect the disclosure provides a roadway unit for a roadway powered electric vehicle system, the unit comprising an upper surface, at least one coil of electrically conductive material beneath the upper surface and configured in use to provide a magnetic field extending above the upper surface, side walls adapted for location adjacent to side walls of a trench in a roadway, and end walls adapted to locate adjacent corresponding end walls of further units.

In one embodiment the unit includes at least two substantially planar coils arranged side by side.

In one embodiment the unit is connected to a power supply.

In one embodiment the unit includes a receiver coil to receive power from another magnetic field. The receiver coil may be provided on an asymmetric core. Alternatively, the receiver coil may be provided on a symmetric core. In one embodiment the unit includes two apertures therein, each aperture being adapted to receive one side of an elongate primary conductive loop, and the receiver coil and core are arranged in the unit so that the receiver coil may receive power inductively from the primary conductive loop.

In another aspect the disclosure provides a roadway powered electric vehicle system comprising:
an elongate primary conductive loop buried in or adjacent to a roadway;
a power supply to supply electric power to the primary conductive loop,
the roadway having a plurality of coils of electrically conductive material beneath the surface of the roadway for providing a magnetic field above the roadway surface, and the coils being inductively coupled to the primary conductive loop.

In one embodiment the conductive path is provided beneath the coils.

In another aspect the disclosure provides a roadway powered electric vehicle system comprising:
a roadway having a plurality of inductive power transmission modules arranged so that a roadway powered electric vehicle receives power from a plurality of the transmission modules at any instant while travelling on the roadway.

In another aspect the disclosure provides a roadway powered electric vehicle comprising:
a plurality of inductive power receiver coils capable of receiving power from a magnetic field provided above the surface of a roadway.

In one embodiment the coils are arranged in a receiver module, with two or more coils being provided in the module. In one embodiment a plurality of receiver modules are provided.

In another aspect the disclosure provides a roadway powered electric vehicle system comprising:
a plurality of power transmission modules in a roadway, the or each power transmission module being capable of supplying power inductively to one or more electric vehicles when the one or more vehicles is on the roadway in the region of that power transmission module,
and a roadway controller to control the quantity of power available to each vehicle dependent on the number of vehicles on a section of roadway, or dependent on a combination of vehicle power requirement and the number of vehicles on the section of roadway.

In one embodiment the roadway controller includes a transmission controller associated with each power transmission module to selectively allow each module to make inductive power available to a vehicle when the vehicle is sufficiently near the module to receive power therefrom.

In one embodiment the transmission controller controls the quantity of power available to the vehicle. The power available may be determined based on a power demand category or type of vehicle to which power is being supplied.

In one embodiment the transmission controller makes power available from the or each power transmission module upon detection of the presence of a vehicle in the region of the or each power transmission module.

In one embodiment the transmission controller makes power available from the or each power transmission module for a predetermined maximum time period after detection of the presence of a vehicle in the region of the or each power transmission module.

In one embodiment the transmission controller ceases to make power available from the or each power transmission module upon detection of the absence of a vehicle in the region of the or each power transmission module.

In another aspect the disclosure provides a roadway powered electric vehicle system comprising:
a roadway having a plurality of power transmission modules therein, the or each power transmission module being capable of supplying power inductively to an electric vehicle when the vehicle is on the roadway in the region of that power transmission module,
one or more roadway powered electric vehicles, the or each vehicle having at least one power receiving module to receive power inductively from the power transmission modules when the or each vehicle is on the roadway in the region of that power transmission module,
and a vehicle power controller to control the quantity of power received by the or each vehicle dependent on the power available to the or each vehicle, the instantaneous power requirements of the or each vehicle, and the state of charge of a battery associated with the or each vehicle.

In one embodiment the vehicle power controller limits the power received by the vehicle. In one embodiment the limit on the power received by the vehicle is dependent on a type or power requirement category of the vehicle.

In another aspect the disclosure provides a roadway powered electric vehicle system comprising:
a roadway having a plurality of multiphase inductive power transmission modules, and
a power supply for supplying power to one or more of the multiphase inductive power transmission modules so that each multiphase transmission module produces a time varying rotating magnetic field above the roadway.

In one embodiment the or each multiphase power transmission module comprises two or more substantially planar coils and each coils has a current out of phase with the other coils, the coils being arranged to provide the time varying rotating magnetic field above the roadway.

In one embodiment the or each multiphase power transmission module includes two substantially planar coils which are overlapped to provide conductive paths that are spaced 0, 90, 180 and 270 electrical degrees.

In one embodiment the conductive paths extend in a direction substantially across the roadway. In another embodiment the conductive paths extend in a direction substantially longitudinally along the roadway.

In another aspect the disclosure provides a roadway powered electric vehicle system comprising:
a roadway having a plurality of inductive power transmission modules, and magnetic shielding provided in or on the roadway to curtail stray magnetic fields.

In another aspect the disclosure provides a roadway powered electric vehicle system comprising:
a roadway having a plurality of inductive power transmission modules, and magnetic shielding provided in or on each module to curtail stray magnetic fields.

In another aspect the disclosure provides a roadway powered electric vehicle system comprising:
one or more roadway powered electric vehicles, the or each vehicle having at least one power receiving module to receive power inductively from the roadway, and magnetic shielding provided in or on the vehicle to curtail stray magnetic fields.

In another aspect the disclosure provides a roadway powered electric vehicle system comprising: one or more roadway powered electric vehicles, the or each vehicle having at least one power receiving module to receive power inductively from the roadway, and magnetic shielding provided in or on the power receiving module to curtail stray magnetic fields.

In another aspect the invention provides a magnetic flux pad for generating or receiving magnetic flux, the pad comprising a magnetically permeable core, two substantially flat overlapping coils magnetically associated with the core whereby there is substantially no mutual coupling between the coils.

In a further aspect the invention provides primary power supply apparatus for an inductive power transfer system, the power supply apparatus including:
a magnetic flux pad for generating a magnetic flux, the pad comprising magnetically permeable core, two substantially flat overlapping coils magnetically associated with the core; and
power supply adapted to provide a current in one coil which has a different phase to a current in the other coil.

In a further aspect the invention provides a method for providing an IPT magnetic flux pad having a plurality of coils in which there is no mutual magnetic coupling between the coils, the method including the steps of:
overlapping the coils, and
varying the overlap between the coils such that an overlap position is achieved whereby there is substantially no mutual coupling between the coils.

Preferably the absence of mutual coupling is detected by detecting when the open circuit voltage induced in one of the coils by energisation of the other coil is minimised.

Further aspects of the invention will be apparent from the following description.

BRIEF DESCRIPTION OF THE DRAWINGS

Examples of embodiments of the invention will be described below with reference to the accompanying drawings in which:

FIG. 3 is a known power system diagram;

FIG. 4 is the diagram of FIG. 3 newly applied to an IPT system.

FIG. 5 is a circuit diagram for an IPT pick-up according to one embodiment of the invention.

FIG. 6 is a diagram of voltage plotted against time for a circuit according to FIG. 5.

FIG. 7 shows simulated waveforms.

FIG. 8 shows observable Q for a range of theta and normalised load resistance.

FIG. 9 shows an example of voltage and current relationships in the circuit of FIG. 5, including angles theta and theta prime.

FIG. 10 is a diagram of theta plotted against theta prime −90 degrees.

FIG. 11 is a diagram of output power plotted against phase delay for different tuning capacitors for a circuit such as that shown in FIG. 5.

FIG. 12 is an example of a circuit diagram for a practical implementation of the circuit of FIG. 5 further including a DC rectifier to provide a DC output.

FIG. 13 is an example of a circuit diagram for a practical implementation of the circuit of FIG. 3 adapted to provide both an AC and a DC output.

FIG. 14 is a diagrammatic end elevation in cross section through a roadway showing a power transmission module.

FIG. 21 is an isometric view of two separated ferrite cores showing an arrangement used for the purpose of simulating their performance in a power transfer system;

FIG. 22 is a computer generated flux plot in a pad as shown in FIG. 21 with 23 A current in windings provided about the ferrite core;

FIG. 23 is a computer generated plot showing flux density in the ferrite core of the pad referred to in FIG. 22 taken through an XY plane half way through the thickness (Z axis) of the ferrite core;

FIG. 24 is a plan view of the arrangement of FIG. 21 illustrating the position of a cut plane through the XZ axis at a point half way through the width (Y axis) of the ferrite cores of the assembly;

FIG. 25 is a computer generated flux plot on the cut plane of FIG. 24 for a 100 mm separation between the pads;

FIG. 26 is a computer generated flux plot on the cut plane of FIG. 24 for a 200 mm separation between the pads;

FIG. 27 is a computer generated plot showing flux density in the cut plane of FIG. 24 for a 200 mm separation between the pads;

FIG. 36 is a diagram showing a roadway powered electric vehicle in use on a roadway according to one embodiment of the invention;

FIG. 37A is a diagram of an inductive power reception and control circuit for a roadway powered electric vehicle according to one embodiment of the invention;

FIG. 37B is a diagram of a multiphase inductive power reception and control circuit for a roadway powered electric vehicle according to one embodiment of the invention;

FIG. 38A is a diagram of uncompensated power output of flat side by side coils (blue line), output of quadrature coil (green line), combined output (black line) against alignment;

FIG. 38B is a diagram showing power delivery to a roadway powered electric vehicle according to one embodiment of the invention under misalignment conditions;

FIG. 40 is a side view and a plan view respectively of a magnetic flux pad;

FIG. 41 is a side view and plan view respectively of the pad of FIG. 40 including a quadrature coil;

FIG. 42 is a side view and plan view respectively of an alternative form of magnetic flux pad;

FIG. 43 is a series of graphs of open circuit voltage coupled in one coil of the pad of FIG. 42 as a function of overlap with the other coil when that other coil is energised;

FIG. 44 shows graphs of uncompensated power against offset for a vertical space of 150 mm and 250 mm respectively;

FIG. 45 is a graph of uncompensated power for three different flux pad constructions (according to FIG. 42) with the receiver pad offset either in the x or y direction at a vertical separation of 200 mm;

FIG. 46 illustrates field plots for the pad construction of FIG. 42 and FIG. 40 respectively at various instances of time over a full cycle of primary resonant current;

FIG. 47 shows the field plot of the pad construction of FIG. 42 with an increasing amount of ferrite in the core (from the top to the bottom direction);

FIG. 48 shows a graph of an example of a power transfer profile of a pad construction according to that shown in FIG. 42 with a receiver pad that accords with that shown in the example of FIG. 41.

DETAILED DESCRIPTION

The magnetic and electronics technology described below consists of four general parts—power supplies, inductive power transmission or transmitter modules, inductive power reception or receiver modules, and controllers. These general parts are described in turn below.

Figure 1A:
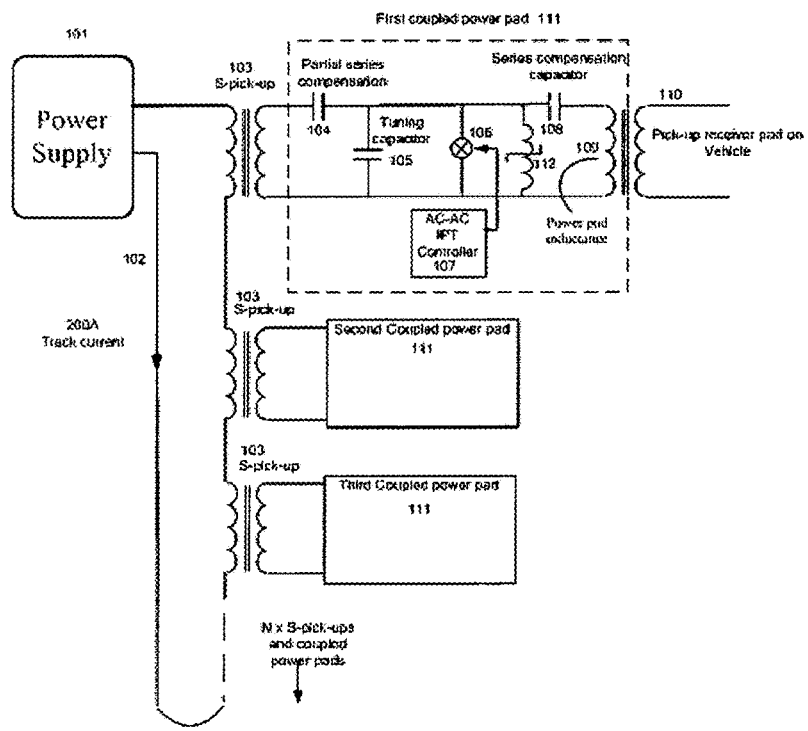
FIG. 1A is a schematic diagram of a roadway powered electric vehicle system according to one embodiment of the invention.
Figure 1B:
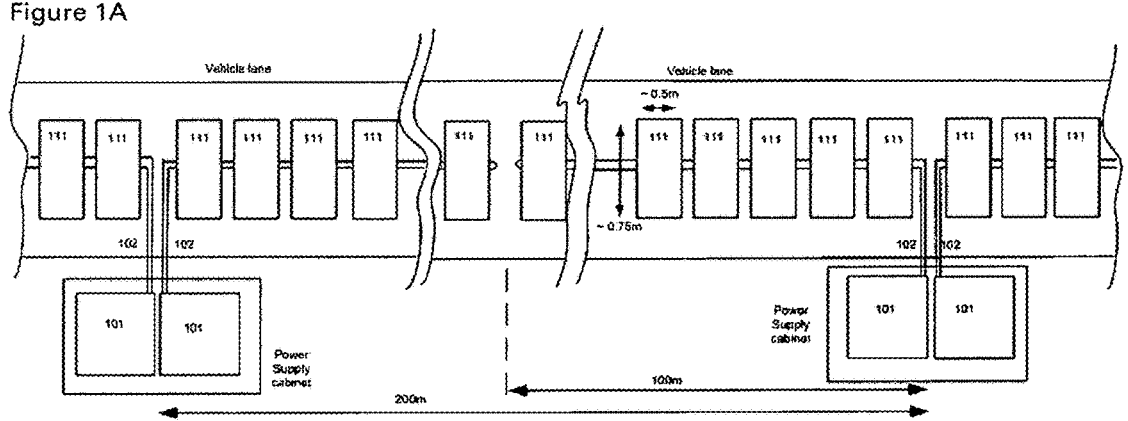
FIG. 1B is a schematic diagram of a roadway including a number of inductive power transmission modules according to one embodiment of the invention.

Headings are used where possible for clarity. Although the description below predominantly refers to roadway and electric vehicle applications, those skilled in the art to which the invention relates will appreciate that the subject matter also has application to IPT systems in general and could be used in applications such as materials handling for example. Power Supply—Single Phase Centre Line Construction Producing a Time Varying Field In one embodiment (shown in FIGS. 1A and 1B by way of example) at the edge of a vehicle surface such as a roadway, a regular succession of power supplies 101 are provided in groups of two, and are spaced around 200 m apart. Each power supply 101 is connected to a three phase utility supply at 50/60 Hz 400/480 V line to line and feeds a 100 m section of roadway. Although this document primarily uses the term roadway to refer to a road, it is intended to include vehicle surfaces in general, including vehicle surfaces where vehicles may be stationary such as garage floors, carparks, bus stops etc. In the embodiment shown in FIGS. 1A and 1B, each power supply 101 is rated at 100 kW but actually produces a single phase output that drives a current of nominally 125 A at a frequency of 20 kHz in an unbroken elongate primary conductive loop 102. This current may vary from approximately 100 A to 250 A depending on the application. As shown in FIGS. 1A and 1B, each loop 102 is approximately 100 m long to thus extend along one 100 m section of roadway.

Each power supply 101 drives a succession of power transmission modules 111 in the roadway by inductive coupling. This inductive coupling is achieved (as shown in both FIGS. 1A, 1B and FIGS. 2A, 2B) using a two wire transmission system for the 125 A feed from the power supply 101 with pick-up coils 103 placed wherever a power module is required. The pick-up coils 103 may take a variety of forms. In the embodiment described the form of pick-up 103 is one such as that described in International Patent Publication WO2006/118474, the contents of which are included herein by reference in their entirety. This form of pick-up has an asymmetric core and is referred to in this document for purposes of convenience as an S-pick-up. However, other forms of inductive power pick-up may be used. For example, a pick-up having a symmetric "E" shaped core, or "H" core, or other known shapes or arrangements may be used.

The output from pick-up 103 is partially series tuned using series capacitor 104 to ensure the correct short circuit current from the coil (as required to drive the power module inductance of 109). The combination of 103 and 104 is parallel tuned using capacitor 105 at the operating frequency of 20 kHz for this embodiment. The reflected impedance of this tuned LC combination back onto the primary supply track 102 is such that the reactance of the section of the 125 A feed in the roadway (to which the pick-up 103 is coupled) is substantially compensated on short circuit. This characteristic is selected since, under normal operating conditions (as described further below), only around 20% of the power transmission modules are supplying power at any one time. The remainder are inactive, being on short circuit. In consequence, the reactance of loop 102 can be designed or controlled to a nominal value independent of exact length and does not need to be broken with additional series compensation capacitors to limit the supply voltage, as is normally the case in industrial applications feeding 50-200 m lengths. The unbroken nature of the loop removes the problem of having additional and problematic terminations present in the main roadway feed to add capacitive correction. Such terminations add loss (both from the joint termination and the losses in any added capacitance) and add to the risk of failure from aging capacitance, failure of joint terminations due to both ground movement or poor construction and aging. Terminations also add problems due to the difficulty in preventing moisture being transported between the cabling and protective sheaths into areas of capacitive correction under thermal cycling, which if present can cause failure.

Figure 2A:
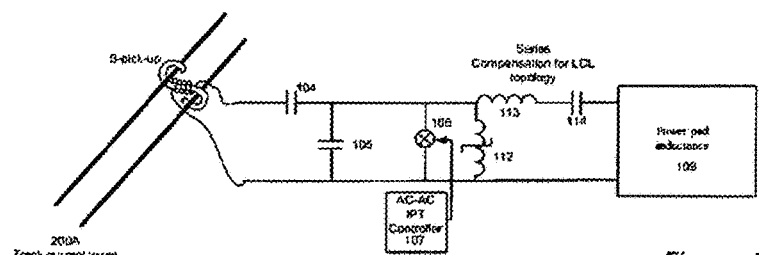
FIG. 2A is a circuit diagram of a control topology using matched reactance's as LCL according to one embodiment of the invention.
Figure 2B:
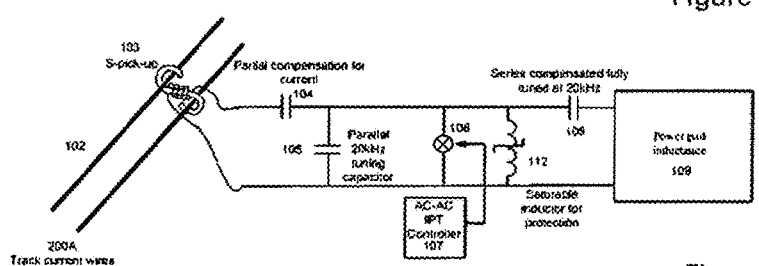
FIG. 2B is a circuit diagram of a further control topology using tuning LC with zero output reactance according to one embodiment of the invention.

The parallel LC pick-up (of 103, 104 and 105) is used in one embodiment as shown in FIG. 2B to drive a fully series compensated power module (comprising 108 and 109 in FIG. 2B) embedded in the roadway. In this embodiment the reactance looking into the combination of: components 108 and 109 is essentially zero. Thus there is the lowest possible voltage stress on components, for example switches.

An alternative embodiment is shown in FIG. 2A where the reactance of the module 109 together with series compensation 113 and 114 combine to give an identical reactance to that of capacitance 105 and the combination of 103 and 104 at 20 kHz (creating a tuned LCL topology at the resonant frequency of the supply).

In both embodiments (shown in FIGS. 2A and 2B) the controller 107 controls switch 106 and enables the module resonance to be controlled such that the magnetic field strength of module 109 can be completely turned off or turned on or varied as required by regulating the current through capacitor 108 or 114. Adjacent modules are controlled to energise sequentially in time and synchronously phase to prevent unwanted power transfer between adjacent modules. The operation of controller 107 is described further below. In an alternative embodiment module 109 may be directly connected to a power supply i.e. not be inductively coupled to the power supply. The correct field strength required to charge a motor vehicle, bus or truck may simply be determined by limiting the current in capacitor 108 or 114 to predetermined levels corresponding to power requirements or demands for different types or categories of vehicle that may use the roadway. In one embodiment the field strength may be controlled to three or more levels, each level corresponding to power, demand category of vehicles travelling along the roadway. For example, in one embodiment vehicles are categorised according to inherent electric power demand. Accordingly, a non-electric vehicle has a zero power demand, a small electric vehicle such as a car has a low power demand and a large electric vehicle such as a truck or bus has a high power demand. In another embodiment, the categorisation may be based on what a vehicle user demands rather than inherent vehicle power requirements.

The control information for determining the level of power supplied to each vehicle could in one embodiment be embedded in an RFID tag associated with each vehicle's on-board power receiver and read using additional sensors placed in advance of, or next to, each power transmission module in the roadway that are monitored by controller 107. In another embodiment control information may be sent via communications to the controller 107 based on response from the driver as to the rate of charge the driver is prepared to pay. In other embodiments the presence of a vehicle may be detected in other ways such as by using a sensor to sense the change in inductance of the coils in the power transmission modules as a vehicle passes over each module.

For protection purposes saturable inductor 112 is used to limit the voltage across 105 and thereby protect the controller switch 106 from overvoltage failure particularly during any large starting or switching transients.

Thus the controller 107 allows power to be selectively made available at selective levels. For example, vehicles may be categorised into non-electric, light electric and heavy electric types. A sensor may then sense the vehicle category (as described further below), and the controller 107 can then control the field available to that vehicle. So if the vehicle is non-electric, no field is made available. If the vehicle is an electric bus for example (i.e. a heavy electric vehicle), then a high field strength is provided.

AC-AC Power Controller

In one embodiment controller 107 allows control of power transferred inductively from the elongate loop 102 to one or more power transmission modules so that an AC supply is provided directly to the transmission module(s) without a rectification step being required. The operation of a controller such as controller 107 above will now be described with reference to FIGS. 3 to 13.

FIG. 3 is a well-known diagram in Power Systems and is used to describe how power is transferred from a generator to another generator or load. The first generator has an output voltage $V_1$ and is connected to the second voltage $V_2$ through an inductor $L_1$. If the phase angle between $V_1$ and $V_2$ is α then the power transferred is given by the generic formula $$P = \frac{V_1 V_2 \sin(\alpha)}{X}$$

Where X is the reactance of inductor $L_1$ at the frequency of operation.

In an inductive power transfer (IPT) system this same diagram may be interpreted slightly differently as shown in FIG. 4. In this case $V_1$ is the voltage induced in the pick-up coil $L_1$ by a current flowing through an IPT track i.e. the primary coil or loop. Thus $V_1 = j\omega MI$ where I is the track current. $V_2$ is now the voltage across the tuning capacitor and is the resonant voltage in the IPT system. In all usual circumstances the phase angle is determined naturally by the operation of the circuit of FIG. 4 under the loading conditions, represented by load resistor R, that obtain from time to time in the circuit. Such analysis is possible as all of the circuit components are linear.

However in one embodiment of the invention two new circuit elements are added to the circuit-switches $S_1$, and $S_2$, which are in series with diodes $D_1$ and $D_2$ as shown in FIG. 5. These switches are operated to disrupt the action of the circuit such that the phase angle may be forced to be a different value to that which would naturally occur. The technique for achieving this is to clamp voltage $V_2$ so that it cannot cross zero until the switches so allow. Switch $S_1$ prevents a rise in the positive voltage across the tuning capacitor C and switch $S_2$ prevents the voltage across the tuning capacitor from going negative. In operation these switches are switched on or off for 180 degrees but are delayed in phase relative to the normal voltage in the circuit as shown in FIG. 6. The overlap between the normally resonant voltage and the switching waveform is θ. This normally resonant voltage is not observable when the circuit is operating with a real load but the current in the track has the same phase and it is easy to observe. Switch $S_1$ is on for most of the negative half cycle of the waveform—where it has no effect—and for a small portion of the normal positive half cycle where it prevents any voltage rise until it turns off. Switch $S_2$ operates in the other half cycle. Both switches are on for 180 degrees but there is no overlap at all. The actual output voltage can have small flat periods in it but for high Q conditions these become very small. But the waveform is still displaced and therefore the power transferred is reduced in a controllable fashion.

In one embodiment the phase of the track current is captured by a separate sensor on the track. Then using a phase locked loop precise 180 degree conduction square wave voltage references may be generated. These reference voltages may then be delayed as required with a microprocessor to give waveforms suitable for driving the switches to control the output voltage. The switches themselves are unidirectional and power MOSFETs provide a low cost choice. These are particularly easy to drive as with 180 degree conduction simple, transformer isolation is suitable. Observed and simulated waveforms in the circuit are shown in FIG. 7 for a range of conditions corresponding to high Q through to low Q. Note that while the switches are nominally on for an angle θ in a practical high Q circuit the actual conduction times are very much smaller as the resonant phase of the circuit changes to accommodate the switching waveforms. Nonetheless the resonant waveform is not correctly phased for unity power factor as the phase has been altered to adjust the power transfer and the circuit therefore has a small leading power factor load reflected back to the track.

Analytical analysis of the circuit is intractable however an expression for the resonant voltage $V_2$ that gives good correlation with, both computer simulations and with practical measurements is:

$$V_2 = \frac{V_1 R}{X} \cos\left(\frac{\theta}{2}\right) \cdot \cos\left(\frac{3\theta}{4}\right)$$

A computer simulation of this expression is plotted in FIG. 8 which may be compared with the mathematical expression above and is reasonably accurate over the full range of operation 0.1<Q<10.

$$\left[\left(\text{Note } Q = \frac{V_2}{V_1} = \frac{R}{X}.\right)\right]$$

The circuits described above are described with reference to the use of a reference voltage to give phase information to the circuit so that the firing angle can be determined. However we have found that the correct firing angle may be determined by observing the angle at which the resonant voltage in the circuit changes sign. As shown in FIG. 9 for a firing angle of θ there is an angle θ̂ which has a unique relationship to the Q of the circuit and to θ but is measured with respect to the voltage induced in the pick-up coil which voltage can only be observed if the pick-up coil is unloaded. A diagram showing the difference between these angles is given at FIG. 10. It is easy to observe this angle and to operate the circuit at angle θ such that the required output is obtained. There needs to be considerable care here as the difference between θ and (θ̂−90) may be very small at the frequency of 40-50 kHz so that the angles must be carefully measured but this task is relatively simple for one skilled in the art and using modern electronics components including microprocessors. The care is important since if θ (a switch on point for one of the switches) occurs too soon the switch will short circuit the resonating capacitor and may be destroyed.

A person skilled in the art to which the invention relates will appreciate that the angle at which the resonant voltage in the circuit changes sign can be determined in a number of different ways. For example, one approach is to use a comparator with a reference to the ground rail to detect the 0.6V to 1V forward bias voltage that leads to conduction of each of the diodes connected in series with the switches (S1 and S2 in FIG. 5). Another possible approach is to use a current transformer on the drain lead of each of the FETs (used in practice to implement switches S1 and S2) in order to detect the onset of current in each switch.

In the operation of the circuit described, both the short-circuit current and the induced voltage are affected as the firing angle is changed and the circuit operates as though L the pick-up coil inductance, C the tuning capacitor, and M the mutual inductance between the track and the pick-up coil are all altered. The variation in M has already been used to vary the output power and control it. But apparent variations in L and C can be used to tune the circuit as shown in FIG. 11. Here the output power of the circuit is measured as the firing angle θ varies from essentially zero to 150 degrees. As expected if the tuning capacitor is exactly correct then the maximum power occurs at a firing angle of zero. But if the tuning capacitor is too small then the maximum power occurs at an increased firing angle and the circuit can be tuned by varying this firing angle. For capacitor values 20% below the design value the system can be tuned to have a power loss of about 1% compared with perfect tuning—but now with a component error of 20%. Capacitors that are too large cannot be tuned as firing in advance causes the switches to short circuit the resonating capacitor.

Referring again to FIG. 2B, controller 107 is known to act as a standard parallel tuned receiver with full decoupling when the AC switches are fully on or off. As such the reflected VARS to track 102 can be determined and are essentially constant. However, when controller 107 is operated with variable clamp-time (in order to adjust the current in power pad 109), this results in variations to the reflected VARS to the track in addition to the expected change in load. If these reflected VARS are left uncompensated, the addition of all VARs reflected from all active pads coupled to track 102 could severely detune power supply 101. The clamp time of each pad is however known and is preferably held constant by each pad's controller 107 during operation so as to keep the current in each pad at approximately the desired level. This information can be communicated to an additional circuit which is transformer coupled to track 102 in close proximity to each pad, whose sole purpose is to adjust a reactive circuit in order to approximately cancel the operational VAR loading introduced by the action of controller 107. This can be achieved using a variety of variable or switched tuning circuits that can adjust a variable capacitor or inductor according to each known clamp time.

In practice there may be a need to add one additional variable tuning circuit at the output of supply 101. There will be a number of small variations in VARS whose cumulative may still cause track inductance 102 to vary beyond a desirable amount and could cause supply 101 to operate inefficiently or to trip. These cumulative VARS will arise from imperfect compensation, imperfect tuning or variations in tuning over time due to ageing and temperature, and variations in magnetic coupling from vehicles coupling power along the roadway using a different number of receivers, at varying heights and offsets. Such variation from ideal operation can be detected in a number of ways such as using measurements of the bridge currents within power supply 101 and this information can then be used to adjust the effective inductance of 102 within safe and efficient operating bounds of supply 101.

Alternative High Frequency Power Supply to Modules

Figure 39B:
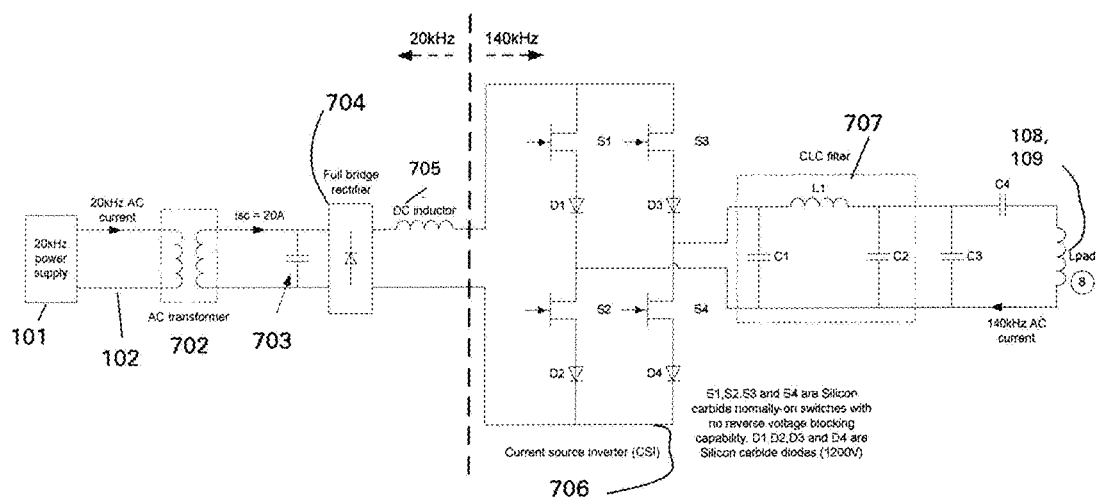
FIG. 39B is a circuit diagram showing an alternative embodiment of a power control system in which there is a frequency change between the primary power supply and the power supplied to the roadway.

Referring to FIG. 39B, an alternative circuit for power supply from the elongate loop 102 to one or more modules is shown. This circuit provides a frequency change as part of the double IPT conversion form the primary power supply 101 to the vehicle. Although the frequency change is discussed below as being from 20 kHz to 140 kHz, those skilled in the art will appreciate that other frequencies may be used, and that the frequency may stay the same, or even decrease.

A frequency increase to 140 kHz has the advantage that the field at the modules is more likely to satisfy ICNIRP requirements, and that high efficiencies can be obtained over the short transmission distance from the inverter to the transmission module or pad. In the first conversion a power supply 101 takes power from a 3-phase utility and produces an output current of 125 A that propagates in a wire buried under the road in the form of extended loop 102. This single wire loop is coupled by 1 turn to a pick-up/transformer 702 that is tuned by parallel tuning capacitor 703 to a resonant voltage less than 700V rms. The pick-up transformer 702 has a 6-turn secondary to give a secondary short circuit current of 21 A. This current passes through diode rectifier 704 to give a DC current of 20 A in DC inductor 705 which current is switched by 4-switch commutator/inverter 706 to produce an output AC current of approximately 19 A rms which feeds the CLC filter 707. This filter is an impedance converter with a characteristic impedance of 36 Ohms and produces an AC output voltage across C2 of 684 V at 140 kHz. This voltage drives the pad or module 108 or 109 with some compensation capacitors C3 and C4. In particular C4 increases the pad or module voltage to 1000 V while C3 tunes the pad to present unity power factor at its rated load. As discussed elsewhere herein, pad or module 108/109 is on or buried under the roadway and couples inductively to a similar pad under a vehicle parked over the pad or module. This is the second IPT conversion for the circuit.

Under fault conditions an open-circuit across C2 presents a short circuit to the commutator 706 which presents a short circuit to rectifier 704 and shuts down the resonant circuit formed by pick-up transformer 702 and capacitor C3 so that no power is drawn from power supply 101. Conversely a short circuit across C2 presents an open circuit to the commutator which must be protected by turning all the switches on. The switches are normally-on devices so the circuit is started in a normally on condition and is easily switched to this under fault conditions.

The circuit has an input at 20 kHz which is rectified to DC by the diode bridge 704 and inverted back to AC at 140 kHz by commutator 706 to drive a power pad or module in an IPT system at 140 kHz. At this frequency the voltage drop per, meter is very high so it is impractical to use along the roadway but here 20 kHz is used along the roadway and the 140 kHz is a very short connection from the impedance converter 706 to the pad 108/109 of only a few millimeters. This use of a higher frequency at the final stage can have advantages of increased efficiency.

A further advantage of this frequency change circuit, is that track 102 operating at 20 kHz does not see any VAR variations present in the 140 kHz circuit, as the rectifier effectively blocks reactive VAR flow. In consequence track 102 can ideally be tuned and where required compensated using static rather than active tuning components.

Power Transmission and Reception Modules

In one embodiment (such as that shown in FIG. 1B) the power transmission modules are around 0.5 m long, but they may be as large as 2 m, around 750 mm wide and 40-150 mm thick. The modules may be arranged in use so that magnetic flux travels in a pattern that is longitudinally or transversely aligned relative to the vehicle surface. Each transmission module encloses a coil of copper wire and some ferrite pieces such that when it is positioned on the roadway and driven from its power supply (as shown in FIG. 14) it can generate a magnetic field that is predominantly above the roadway surface with minimal field below the module such that wires pipes, cables etc under the roadway do not have voltages or currents induced in them. Thus the 125 A feeder and the power transmission module do not interfere with each other at all. In FIG. 14 the magnetic field provided by the module is seen as extending across the roadway i.e. from one side to another. In another, less preferred, embodiment the field provided by a transmission module may extend longitudinally along the roadway. The power transmission module may be provided in a roadway unit by being encased in a suitable material such as concrete for example. In one embodiment the unit includes two apertures, each aperture being adapted to receive one side of the elongate primary conductive loop, and the receiver coil and core 103 are arranged in the unit so that the receiver coil may receive power inductively from the primary conductive loop. In this manner roadway units may be provided that include side walls adapted for location adjacent to side walls of a trench in a roadway, and end walls adapted to locate adjacent corresponding end walls of further units, so a modular solution is provided.

The general construction of the power transmission and reception modules according to one or more embodiments will now be described below in further detail by way of example with reference to FIGS. 15A to 21.

The power transfer modules described below allow magnetic flux generation or linkage to be achieved for the purpose of inductive power transfer and have particular advantages for electric vehicle applications. The modules described are commonly (although not necessarily) provided in the form of a discrete unit which may if necessary be portable, and which typically have a greater extent in two dimensions relative to a third dimension so that they may be used in applications such as electric vehicle charging where one pad is provided on or in a ground surface and another in the vehicle.

Figure 15:
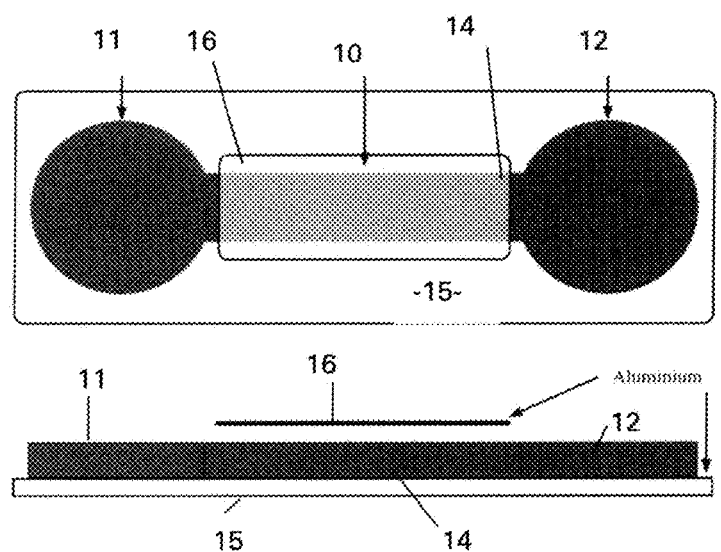
FIG. 15 is a plan view and elevation in cross section of an embodiment of a new inductive power transfer (IPT) power transmission or reception module in the form of a pad.

Referring to the arrangement of FIG. 15, a module is shown which combines three leakage flux control techniques to produce a much enhanced performance. In this regard it uses a novel "flux pipe", generally referenced 10, to connect two separated flux transmitter/receiver regions 11 and 12. The flux pipe provides an elongate region of high flux concentration from which ideally no flux escapes. The flux pipe 10 in this embodiment has a core 14 of ferrite to attract flux to stay in the core and a back-plate 15 of aluminium to 'frighten' or repel flux from leaking from the core; above the core there may be a separate aluminium plate 16 to complete the same 'frightening' task. Magnetic flux is attracted to the ferrite, and it is repulsed by the aluminium. With electric circuits there is a large difference between the conductivity of conductors—typically $5.6 \times 10^7$ for copper; and air—in the order of $10^{-14}$—but this situation does not pertain with magnetic fields where the difference in permeability between ferrite and air is only the order of 10,000:1 or less. Thus in magnetic circuits leakage flux in air is always present and this has to be controlled to get the best outcome.

The ends of the core 14 comprise the transmitter/receiver regions 11 and 12. The top plate 16 does not cover the regions 11 and 12, so the flux is directed generally upwardly from the regions as will be seen further below.

Figure 16:
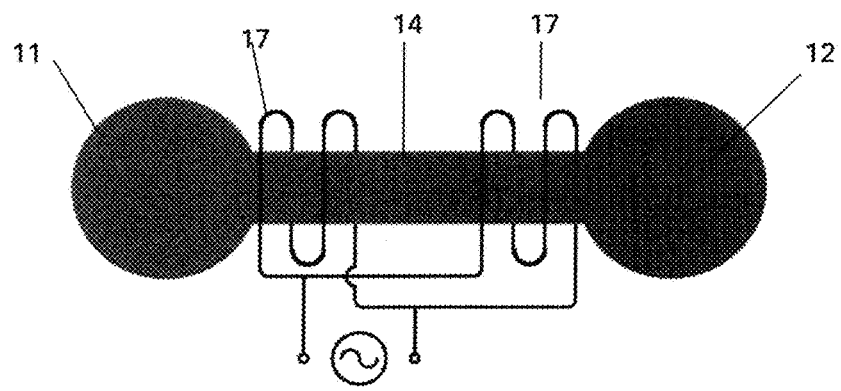
FIG. 16 is a diagrammatic view of the pad of FIG. 15 showing one example of a winding arrangement.

Plate 16 cannot be electrically connected to the backing plate 15 or the combination would constitute a short circuited turn. There is a winding electromagnetically associated, with the core 14 to electrically connect to the pick-up and the third flux control technique concerns this winding. It is well known that long toroidal windings have but small or very small leakage flux outside them. In the situation here a toroidal winding covering the full length of the flux pipe would have too much inductance but the winding can be partitioned into several windings 17 that are magnetically in series but electrically in parallel, as shown in FIG. 16. In practice two windings in magnetic series-electrical parallel placed with one at or toward each end of the flux pipe is a good approximation to a continuous winding and in some circumstances may outperform a single winding.

The provision of a winding arrangement that covers substantially the full length of the core 14 means that little flux escapes from the core. For example, in the embodiment having two windings connected electrically in parallel (magnetically in series), the flux linkages in each winding must be the same so essentially no flux can escape from the core. Thus, plate 16 is not essential.

Figure 17:
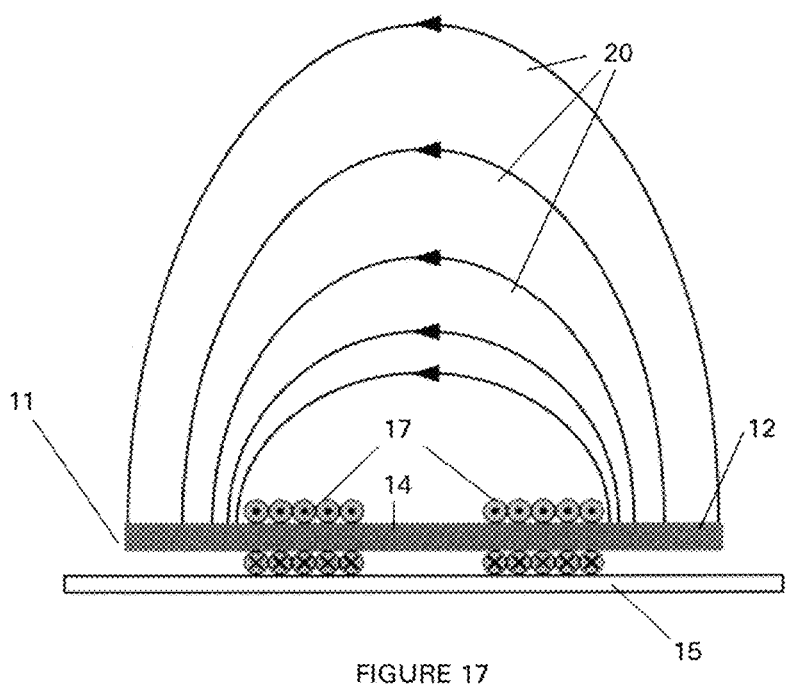
FIG. 17 is a diagrammatic elevation in cross section of the pad of FIG. 15, and showing flux lines.
Figure 18:
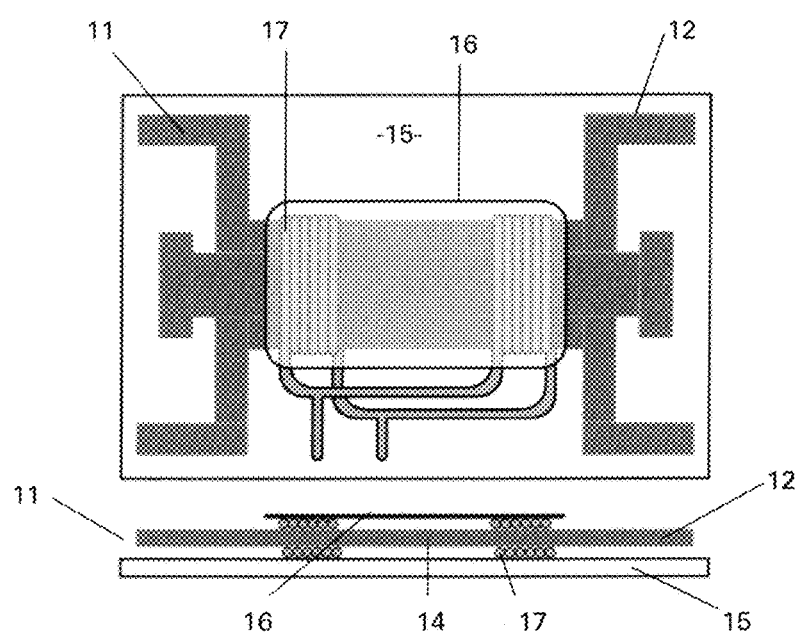
FIG. 18 is a plan view of another embodiment of a new pad based on the design of the pad of FIG. 15.
Figure 19:
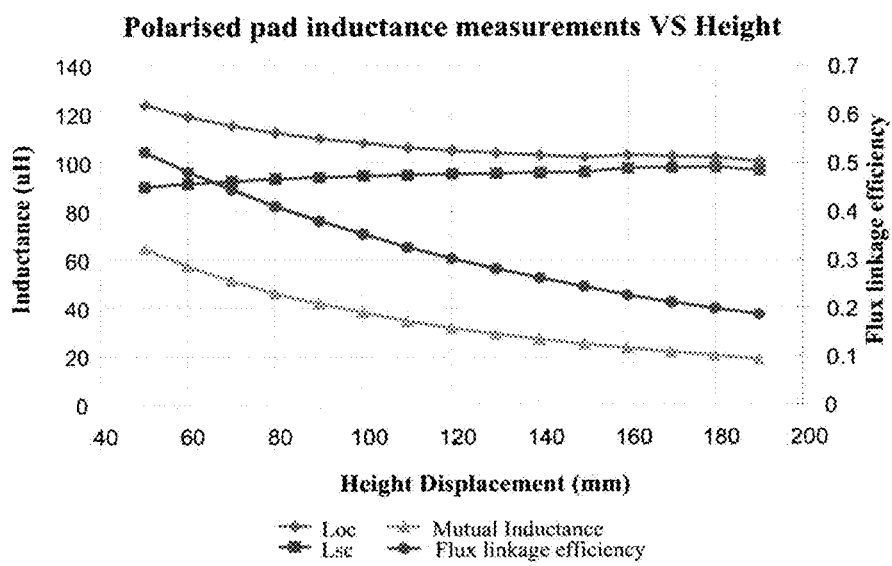
FIG. 19 is a graph of inductance measurements and flux linkage efficiency with respect to height displacement for a pad such as that of FIG. 17.
Figure 20:
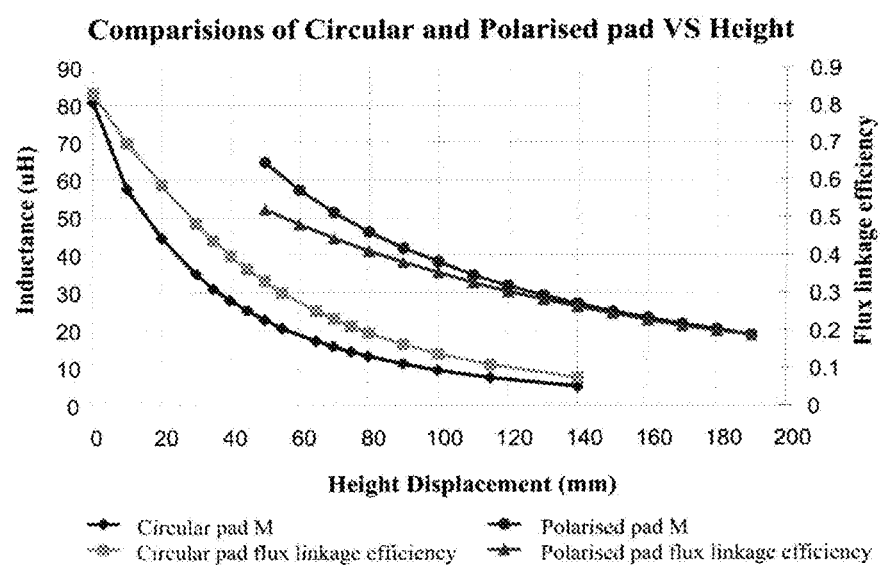
FIG. 20 is a graph of inductance measurements and flux linkage efficiency with respect to height displacement for a Circular pad and the pad of FIG. 17 (referred to as the Polarised pad)

The flux paths from a module as in FIG. 15 are shown in FIG. 17 by flux lines 20. As before they are approximately semi-elliptical but they are from a much larger base than the ferrites of known circular module arrangements and therefore can operate over much larger separations. At the centre of the pick-up the flux paths are horizontal as required. A practical power transfer module embodiment is shown in FIG. 18 and measured self inductance and mutual inductance for this module is shown in FIG. 19. A performance comparison of a known circular module and the new module of FIG. 18 is shown in FIG. 20. The module design of FIGS. 15 and 18 is polarised so that the ends 11 and 12 must be aligned, but that is relatively easy to implement.

A useful feature of the new module design disclosed herein is that the number of turns of the primary and secondary coil may in some embodiments be kept the same. This is radically different than the conventional IPT system setup, which normally has an elongated loop of one turn on the primary side and has winding with multiple turns on the secondary side. This setup has two significant features, 1) the magnetic structure of both primary and secondary (i.e. transmitter and receiver) modules are the same or similar i.e. substantially the same, and 2) the induced voltage and uncompensated power at the secondary output (i.e. the receiver module) are independent of the operating frequency by varying the number of turns in relation to the frequency change.

In one embodiment which we now describe by way of example, the uncompensated power ($S_u$) and induced voltage ($V_{oc}$) of an IPT receiver are commonly known and are expressed in equation 1 and 2, where $I_1$ is the primary track current, $L_1$ is the primary track inductance and $N_1$ and $N_2$ are the number of turns in the primary and secondary (i.e. transmitter module and receiver module) respectively. $N_1$ is equal to $N_2$ is equal to N, in this example.

Under these conditions the rated uncompensated power for the receiver module $S_u$, the mutually coupled voltage $V_{oc}$ and the terminal voltage on the transmitter module $V_1$ are given by $$S_u = \frac{\omega \cdot M^2 \cdot I_1^2}{L_2} \propto \frac{f \cdot (N_1 N_2)^2 \cdot I_1^2}{N_2^2} \propto f \cdot N^2 \cdot I_1^2 \quad (1)$$

$$V_{oc} = j\omega \cdot N_1 N_2 \cdot I_1 \propto f \cdot N^2 \cdot I_1 \quad (2)$$

And $$V_1 = j\omega \cdot L_1 \cdot I_1 \propto f \cdot N^2 \cdot I_1 \quad (3)$$

Note that the short circuit current is proportional to M/L and is independent of the number of turns $$I_{SC} = I \frac{M}{L_2} = I \cdot k \quad (4)$$

where k is the magnetic coupling factor between the primary and the secondary (i.e. transmitter and receiver). As mentioned earlier, the receiver induced voltage and the uncompensated power are to be the same for a different operating frequency. This also means that the terminal voltage and the short circuit current are also equal. Equations 1 and 2 can be rewritten as shown in equations 5 and 6 respectively for the same uncompensated power and induced voltage but different operating frequency. Here $N_a$ is the number of turns for a first frequency of operation and $N_b$ is the number of turns for a second frequency of operation, and $I_a$ and $I_b$ are the respective currents.

$$f_a N_a^2 I_a^2 = f_b N_b^2 I_b^2 \quad (5)$$

$$f_a N_a^2 I_a = f_b N_b^2 I_b \quad (6)$$

From equation 5:

$$N_b I_b = N_a I_a \sqrt{\frac{f_a}{f_b}} \quad (7)$$

Using equation 6 and 7:

$$\frac{N_b}{N_a} = \frac{f_a N_a I_a}{f_b N_b I_b} = \frac{f_a}{f_b} \sqrt{\frac{f_b}{f_a}} = \sqrt{\frac{f_a}{f_b}} \quad (8)$$

Using equation 7 and 8:

$$\frac{I_b}{I_a} = \sqrt{\frac{f_a N_a^2}{f_b N_b^2}} = \sqrt{\frac{f_a}{f_b} \cdot \frac{f_b}{f_a}} = 1 \quad (9)$$

Equation 5 to 9 indicate that the pick-up uncompensated power and $V_{oc}$ will be the same for different frequency while the primary current (i.e. current in the transmitter coil(s)) is kept the same and the winding turns are varied according to equation 8. For example, an arrangement of two modules with 15 turns on both the transmitter and receiver, designed to operate at 38.4 kHz, would need to have the number of turns increased to 21 at 20 kHz in order to keep the receiver $V_{oc}$ and uncompensated power the same. In other words, this feature enables modules with the same magnetic design to be used at a different frequency, and the receiver module output characteristic can be maintained the same simply by scaling the turns number accordingly. However, as shown in equation 10, the core flux is proportional to the number of turns and current, thus keeping the current constant and varying the number of turns will vary the core flux, and hence the flux density. By substituting equation 8 into equation 10, it can be shown that the flux in the core is varying proportional to $\sqrt{(f_a/f_b)}$, which is equivalent to equation 8. Thus, if the operating frequency is scaled down, the cross sectional area of the ferrite core may need to be increased to avoid ferrite saturation. An increase of cross sectional area is preferably done by increasing the thickness of the ferrite core so the magnetic reluctance path of the module remains nearly identical.

$$\phi = \frac{L \cdot I}{N} = \frac{N^2 \cdot I}{N \cdot R_m} \propto N \cdot I. \quad (10)$$

where $R_m$ is the magnetic reluctance of the flux path.

The eddy current loss ($P_e$) and hysteresis loss ($P_h$) equations for the core are shown in equation 11 and 12 in units of W/m$^3$. If the ferrite core cross sectional area are kept the same, the ratio of the eddy current loss and hysteresis loss for two different operating frequencies are given by equations 13 and 14.

$$P_e \propto B^2 f^2 \propto \frac{\phi^2 f^2}{A^2} \propto \frac{N^2 I^2 f^2}{A^2} \quad (11)$$

$$P_h \propto f \cdot B^n \propto f \cdot \left(\frac{\phi}{A}\right)^n \propto f \cdot \left(\frac{N \cdot I}{A}\right)^n \quad (12)$$

where n is the Steinmetz coefficient for the material and is normally in the range of 1.6-2.

$$\frac{P_{e\cdot b}}{P_{e\cdot a}} = \frac{N_b^2 I^2 f_b^2}{N_a^2 I^2 f_a^2} = \left(\frac{N_b f_b}{N_a f_a}\right)^2 = \left(\sqrt{\frac{f_a}{f_b}} \cdot \frac{f_b}{f_a}\right)^2 = \frac{f_b}{f_a}. \quad (13)$$

$$\frac{P_{h\cdot b}}{P_{h\cdot a}} = \frac{f_b (N_b I_b)^2}{f_a (N_a I_a)^2} = \frac{f_b N_b^2}{f_a N_a^2} = 1. \quad (14)$$

The above expressions suggest that for the same cross sectional area and volume, the hysteresis loss of the core will remain constant regardless of the frequency but the eddy current loss in the core will decrease proportionally to the decrease of operating frequency. As the overall power loss in a ferrite core is dominated by its hysteresis loss, most of the attributes, apart from the core flux density, of the charger pad will remain approximately the same with the operating frequency scaling process.

However, as discussed earlier the trade off of operating at a lower frequency is the increase of flux density in the core by $\sqrt{(f_a/f_b)}$. Thus to accommodate the higher flux density the ferrite cross sectional area should be increased in order to keep the flux density the same. With this increased volume of ferrite and keeping the flux density constant, the power loss density in the ferrite core is expected to be lower as shown below. Equation 11 and 12 express the eddy current loss and hysteresis loss in terms of watt per m$^3$, thus the total eddy current and hysteresis loss should take into account the ferrite volume (A*L) shown in equation 15 and 16 respectively.

$$\frac{P_{e\cdot b}}{P_{e\cdot a}} = \frac{\frac{\phi_b^2}{A_b^2} \cdot f_b^2 \cdot A_b \cdot L}{\frac{\phi_a^2}{A_a^2} \cdot f_a^2 \cdot A_a \cdot L} = \frac{N_b^2 I^2 f_b^2}{N_a^2 I^2 f_a^2} \cdot \frac{A_a}{A_b} = \frac{f_b}{f_a} \cdot \frac{A_a}{A_b} \quad (15)$$

where L is the length of the charger pad ferrite core length and is kept constant.

$$\frac{P_{h\cdot b}}{P_{h\cdot a}} = \frac{f_b \cdot \left(\frac{\phi_b}{A_b}\right)^2}{f_a \cdot \left(\frac{\phi_a}{A_a}\right)^2} \cdot \frac{A_b \cdot L}{A_a \cdot L} \quad (16)$$

$$= \frac{f_b \cdot \left(\frac{N_b I}{A_b}\right)^2}{f_a \cdot \left(\frac{N_a I}{A_a}\right)^2} \cdot \frac{A_b}{A_a}$$

$$= \frac{f_b}{f_a} \cdot \left(\frac{N_b}{N_a}\right)^2 \cdot \frac{A_a}{A_b}$$

$$= \frac{A_a}{A_b}$$

Referring to the example discussed earlier where a charger pad operating frequency was scaled from 38.4 kHz to 20 kHz, the ferrite area will need to be increased by a factor of 1.385 $\sqrt{(38.4 \text{ kHz}/20 \text{ kHz})}$ in order to keep the flux density the same. Thus the eddy current and hysteresis loss of the charger pad, operating at 20 kHz, will be reduced by 37.59% and 72.17% respectively, compared with operating at 38.4 kHz at the same core flux density.

A Simulated Example of Module Performance

Referring now to FIGS. 21 to 27 a simulation of coupled power transfer modules according to the invention will be described to provide an example of a possible embodiment and its use. In this example a coupled system of power transfer modules is simulated with the receiver winding open circuited. FIG. 21 shows the arrangement of the ferrite core which is essentially 93×28 ×16 mm blocks of ferrite ground to give very close fitting, and then glued together. The ferrite is surrounded by an aluminium wall with an 8 mm gap between the ferrite and the aluminium, and is 5 mm above an aluminium backing plate. A flux plot for the driven pad (i.e. the pad connected to a power supply) is shown in FIG. 22 for the situation where there are two coils driven magnetically in series, electrically in parallel with a current of 23 A. In these circumstances the flux density midway through the ferrite is shown in FIG. 23. As shown the "flux pipe" is very effective in carrying the flux from one end of the pad to the other. In particular, it can be seen from FIGS. 25 and 26 that there is essentially no leakage flux beyond the region between the pads.

For coupled modules a cut-plane is shown in FIG. 24 and the other Figures use measurements along this cut-plane to illustrate the performance of the system. The flux lines at 100 mm spacing between pads are given in FIG. 25 and for 200 mm spacing in FIG. 26. The flux density in the ferrite is shown in FIG. 27. As the simulations show, the flux pipe efficiently carries flux from one end of the pad to the other and provides good magnetic coupling between the two pads. The flux density in the coupled pads is shown in FIG. 27. The maximum flux density in the driven pad is approximately 0.2 T which is safely below the saturation for this ferrite. The flux density in the pick-up pad is lower but will increase substantially to about the same as the transmitter pad when the pick-up is resonated.

Further Power Transfer Module Embodiment

Figure 28A:
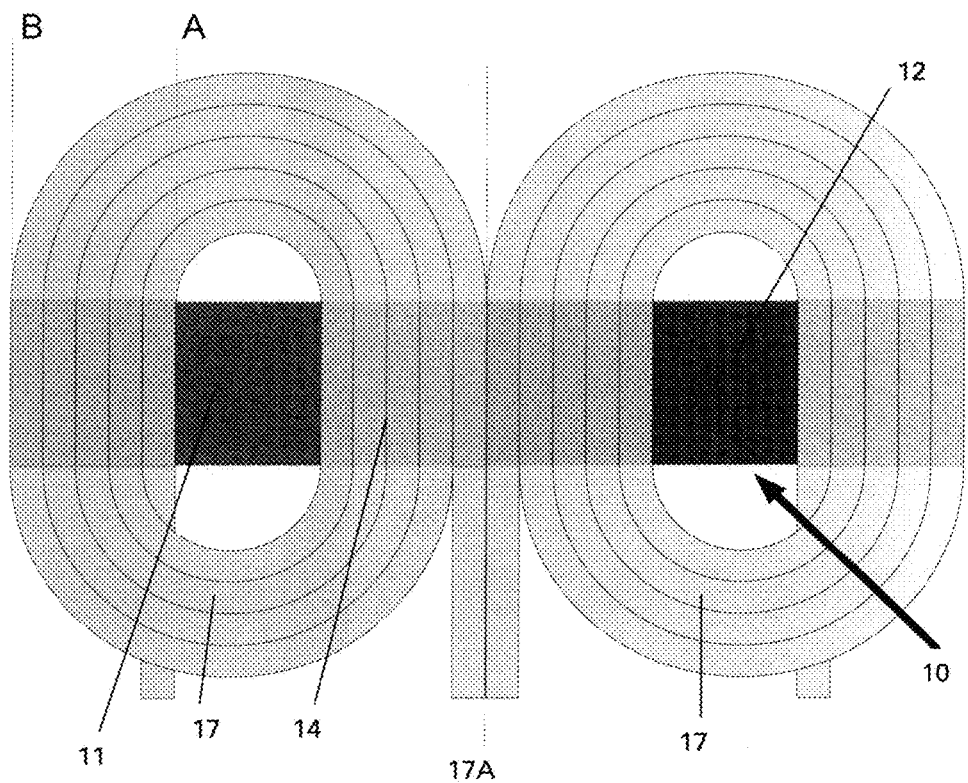
FIG. 28A is a plan view of a further embodiment of inductive power transfer apparatus which may be provided in the form of a module.
Figure 28B:
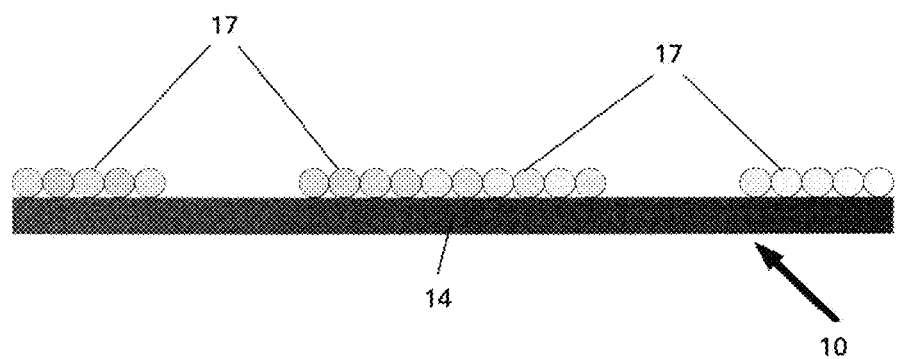
FIG. 28B is a side elevation of the apparatus of FIG. 28A.
Figure 28C:
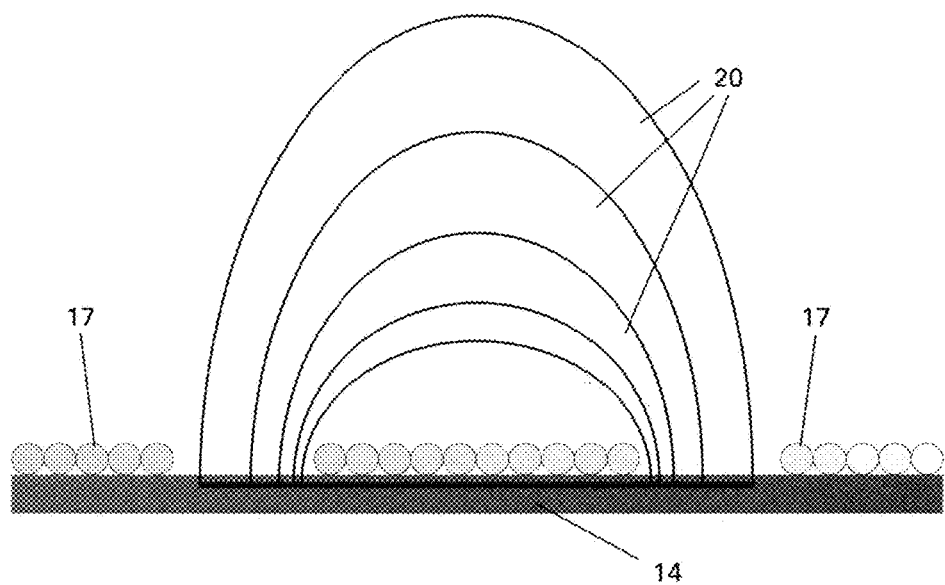
FIG. 28C is a view of FIG. 28B but also showing flux lines.

As with the module arrangement above, the modules of this embodiment use a high permeability core through which magnetic flux is conveyed in order to provide a desired flux path for use with a further arrangement of the same design. Coils which are substantially planar, i.e. flat, sit on top of the flux core. Thus there is no straight path through the core that passes through the coils. Ideally there should be two coils in close proximity to each other. The complete arrangement is shown in FIGS. 28A-28C. Referring to those Figures, in this arrangement the two coils 17 are essentially touching along the centre line 17A, and may overlap slightly. The flux pipe 10, comprising core 14, extends to the ends of the coils 17. The coils or windings 17 are flat, being substantially planar, and are arranged in substantially the same plane (i.e. are co-planar) on one side of the core14. In one embodiment the core 14 is provided along the centre line of the coils 17 and should extend past the hole in the centre of each coil to at least the position indicated by A. The core 14 may extend under the coil 17 to position B or even further. The holes in the coils 17 act as pole areas which are the receiver/transmitters 11 and 12 for the primary or pick-up modules. In one embodiment the core 14 is made of ferrite bars in strips (not shown in FIGS. 28A-28C), and air-gaps are acceptable between the strips to simplify manufacture. The ideal flux paths 20 are shown in FIG. 28C and are only on one side of the core 14—the ideal situation. In principle there is ideally no flux out the back of the arrangement (i.e. on the side of the core 14 opposite to the side on which coils 17 are mounted) and therefore no aluminium screen is required. However, in practice a light screen may be used in some embodiments as errors and imperfections in the ferrite bars comprising the core 14 can cause small leakage fluxes that should be contained.

Inductive power transfer modules according to the arrangement described immediately above are very easy to use as the leakage flux from them is very small. They can be placed quite close to metallic objects without loss in performance, and they are largely unaffected by connecting wires etc.

In a further embodiment it may be noted that the arrangement of the coils in a receiver or transmitter module mounted horizontally on a vehicle makes the pick-up, i.e. the receiver, sensitive to a first direction of the flux which is longitudinally directed (i.e. having a direction parallel to the core 14, and being in the X-axis direction with reference to the drawings) with respect to the flux generator (the horizontally oriented transmitter module). To improve the magnetic coupling of the receiver with respect to misalignment, a "second" coil can be arranged that is sensitive to a second component of the flux that is substantially vertical with respect to the stationary transmitter.

Figure 29:
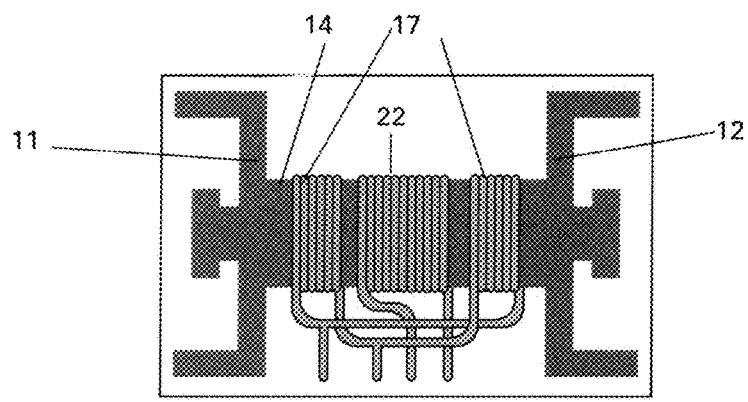
FIG. 29 is a diagrammatic illustration of a further embodiment of inductive power transfer apparatus including a centre, or quadrature coil.
Figure 30:
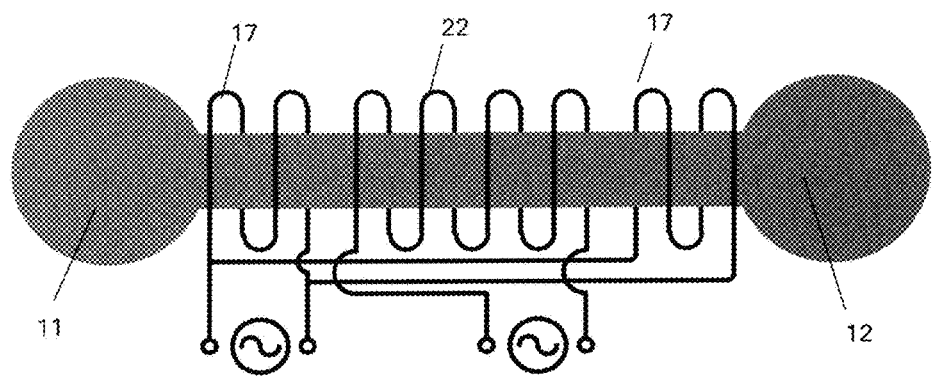
FIG. 30 is an electrical wiring diagram illustrating the coil winding arrangement for the apparatus of FIG. 29.

FIG. 29 shows a further embodiment of a receiver with a "horizontal" flux sensitive coil 22 now positioned in the centre and the outer two coils 17 connected out of phase to produce a second coil sensitive to the vertical component. This electrical connection is not shown clearly in FIG. 29 but is shown explicitly in FIG. 30.

Figure 31A:
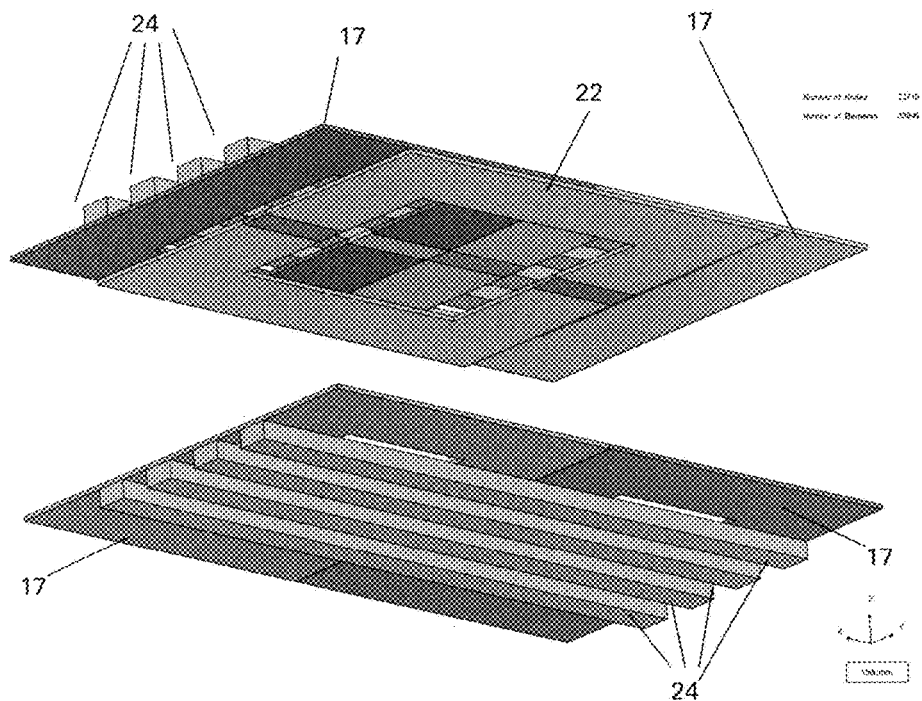
FIG. 31A is an isometric view from above of a flux transmitter and flux receiver (oriented above the flux transmitter).
Figure 31B:
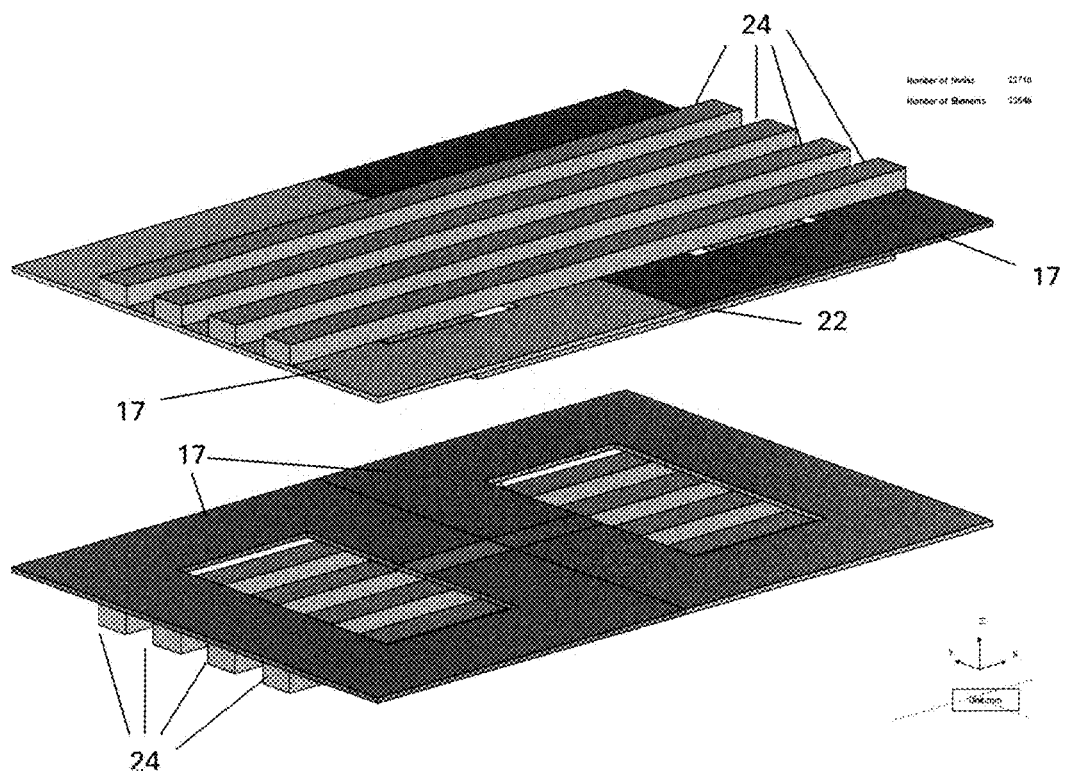
FIG. 31B is an isometric view from below of the arrangement of FIG. 31A.

For the receiver of FIGS. 28A-28C a second flat coil 22 can also be placed above the core with one suitable arrangement shown in FIGS. 31A and 31B, sensitive to the vertical component of the field. As in the original pick-up structure, this additional coil exists only on one side of the core 14 and therefore ideally maintains all of the flux lines on the side of the receiver directed towards the transmitter.

As shown in FIGS. 31A and 31B, only the receiver is modified with a centre, or quadrature, coil 22. This second coil is particularly sensitive to misalignment in the X-direction (i.e. the horizontal longitudinal direction), but not in the Y-direction (being the horizontal transverse direction perpendicular to the core 14). This complements the original receiver which is sensitive to misalignment in the Y-direction, but which because of its structure is less sensitive to movement in the X-direction. The combined output of both receiver coils enhances the sensitivity of the receiver enabling the receiver to be positioned nominally in the ideal position and still couple the required power. FIGS. 31A and 31B also show an arrangement of spaced ferrite rods or bars 24 that comprise core 14.

Figure 32A:
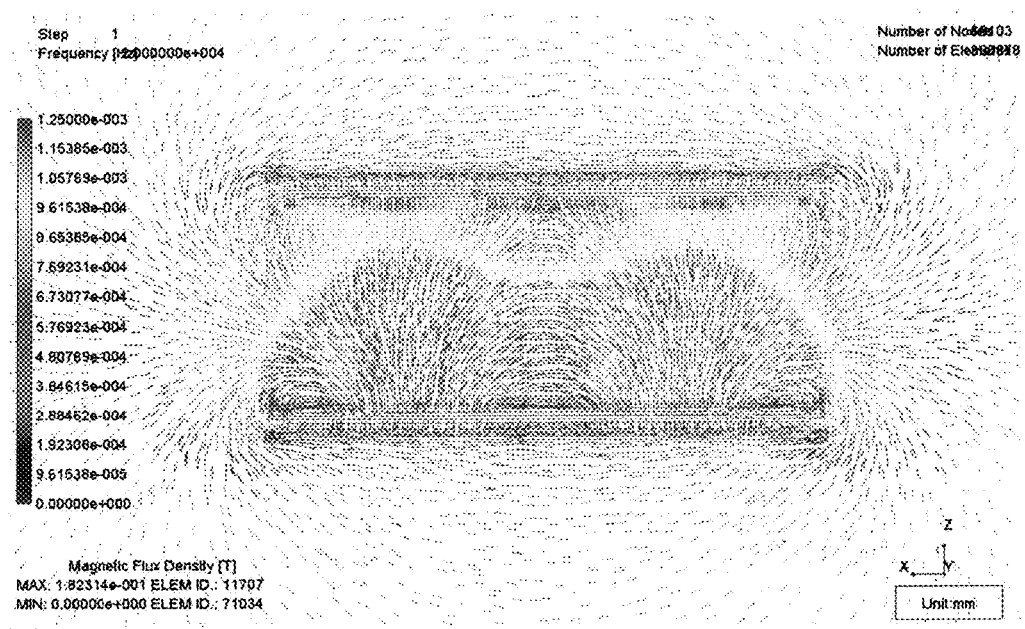
FIG. 32A shows flux lines based on a simulation of the arrangement of FIGS. 31A and 31B when the transmitter and receiver are aligned with a 200 mm separation between the transmitter and receiver.
Figure 32B:
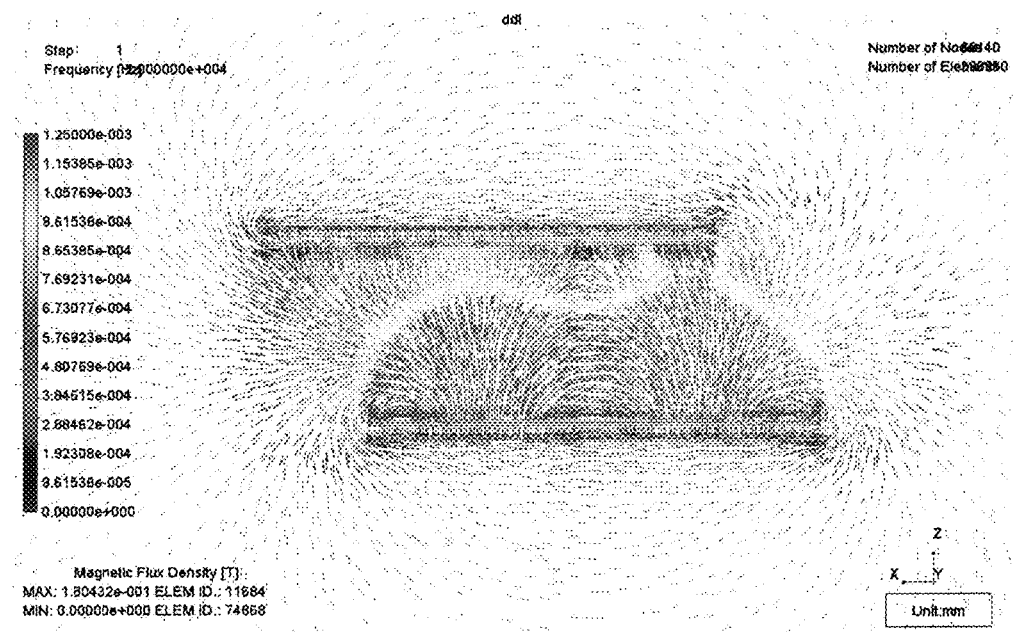
FIG. 32B shows flux lines based on a simulation of the arrangement of FIGS. 31A and 31B when the transmitter and receiver are misaligned in the X axis direction.

As an example, the flux lines using the module design as shown in FIGS. 31A and 31B without any form of compensation are shown in FIGS. 32B and 32A with and without some misalignment. Here the transmitter and receiver are identical except for the addition of the second "vertical flux" coil (i.e. coil 22 of FIGS. 31A and 31B) in the receiver. The transmitter and receiver both have length 588 mm and width 406 mm and are separated vertically by 200 mm. The current in the transmitting coil is 23 A at 20 kHz. Notably the majority of the flux exists between the transmitter and receiver while a very small leakage flux is shown to exist outside this area. In FIG. 32A these flux lines couple the first receiver coil, while in FIG. 32B the majority of the flux lines couple the second receiving coil thereby enhancing the output power capability of the receiver.

Figure 33:
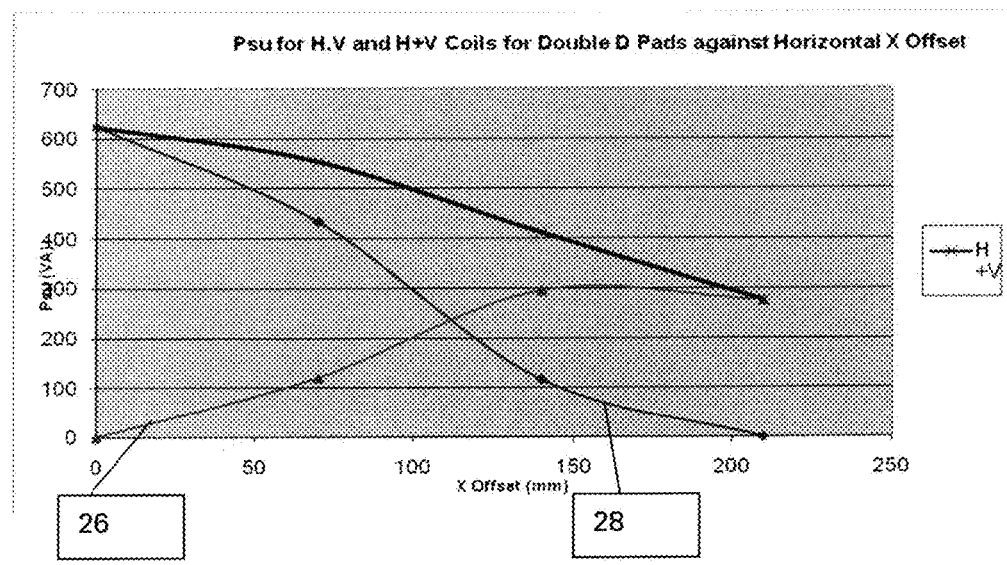
FIG. 33 is a diagram of power against displacement in the X axis direction for the arrangement of FIGS. 31A and 31B.
Figure 34:
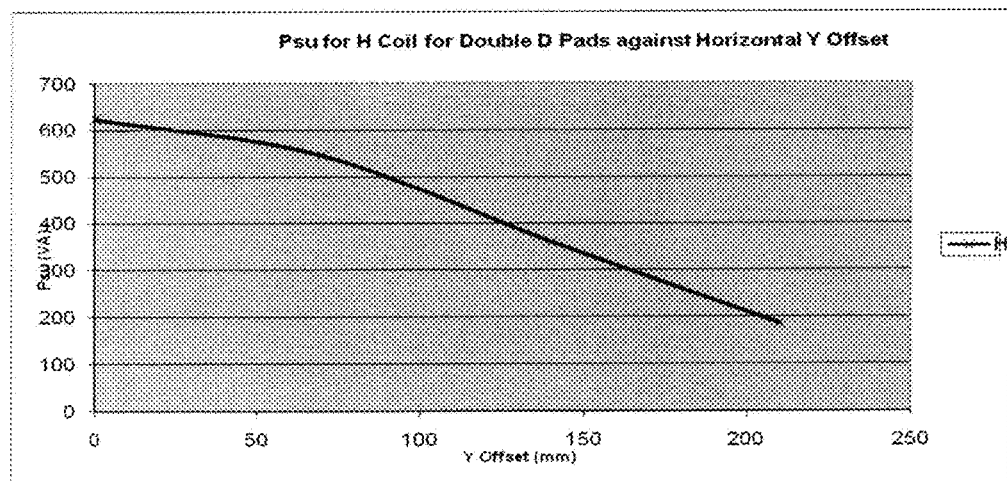
FIG. 34 is a diagram of power against displacement in the Y axis direction for the arrangement of FIGS. 31A and 31B.

In FIGS. 33 and 34 the VA generated from the output of a receiver coils with and without misalignment is also shown. In FIG. 33 the total and separate VA contribution of receiver coils from a magnetic simulation of the modules shown in FIGS. 31A and 31B is shown when the receiver is misaligned (relative to its ideal position centred above the transmitter) in the X direction. In FIG. 33 curve 26 represents the VA contribution of coil 22, curve 28 represents the combined VA contribution of coils 17, and the remaining curve represents the total form coils 17 and 22. As noted the second coil 22 substantially enhances the output so that if a 2 kW output were required at 0 X-offset the required electronic tuning must boost the VA output by around 3.2. At 140 mm X-offset the required electronic boost (Q) without coil 22 is more than 17 times (which is practically difficult due to the sensitivity of the tuning required) whereas with coil 22 an effective boost of around 4.8 is required and that is easily achieved.

Coil 22 is not expected to be sensitive in the Y direction when the receiver is positioned with 0 offset in the X direction. This is verified in the magnetic simulations shown in FIG. 34 where there is shown to be no contribution to the total power from the coil 22. This is however not required as the combined output of coils 17 is naturally sensitive in this direction. At 140 mm offset in the Y direction, a 2 kW output is possible with an electronic tuning (Q) of around 5.5.

In practice it is prudent to ensure that the voltage at the terminals of the module does not reach unsafe levels. Therefore in some embodiments, capacitance may be added in series with the windings inside the module to lower the inductance seen at the module terminals and therefore control the voltage at these terminals to be within suitable limits (say 300-400V). Without this the terminal voltage could be several kV which is undesirable and potentially unsafe. The capacitance can be placed in series with the windings at any convenient place within the apparatus. Thus in some embodiments one or more capacitors can be placed in series with the windings at the terminal points inside the module housing, and in other embodiments capacitors can be distributed along the windings by breaking the winding into suitable sections with series capacitances in case the internal voltages on a single coil are ever too high.

There is also the practical issue of possible stray fields around the apparatus in use. Therefore, in some embodiments, steel or other absorbent material can be added to absorb stray fields. In the example of a power transfer module provided on a floor for transferring power to a receiver on a vehicle, a sheet of steel can be provided between the floor and the aluminium at the base of the module. In this way the steel (or other lossy metallic material or carbon fibre) absorbs stray fields to contain the peripheral unwanted magnetic fields to ensure that the apparatus is within ICNIRP standards (6.25uT)—it absorbs a few watts but ensures that fields are not radiated outside the design area. Essentially the size of the aluminium plate and the dimensions of the steel or other lossy material can be adjusted to suit, and in areas where there are several modules, a single lossy sheet could be used and modules placed on it as required. Similarly, a module mounted on the underside of a vehicle for receiving power inductively may be mounted in such a way that steel in the vehicle body is used to absorb stray fields, or steel can be added as required to meet the ICNIRP standards.

Magnetic shielding may also be provided in or on the roadway or in or on the vehicle to absorb and thus curtail stray magnetic fields. Shielding may also be provided around the transmission and/or reception modules. Examples of appropriate shielding include lossy magnetic paint or materials loaded with appropriate metals, and in the roadway may include reinforcing steel. In one embodiment of the roadway powered electric vehicle system one or more power transmission modules are provided in a roadway unit that lies in a slot in the middle of a vehicle lane and is covered with a strong cover that allows the passage of magnetic fields through it but is easily able to take the weight and impact of large trucks and buses running over it. It will be appreciated that the cover may be an integral part of the unit or module. The cover or unit may be a ceramic material, or concrete.

In normal operation vehicles straddle these power transmission modules and power is transferred to appropriate receivers on the vehicles using the magnetic fields generated in each roadway power module. All the power from the power supplies to the power modules is conveyed by a fully insulated distribution line at 125 A, at 20 kHz. In the interests of safety the 3-phase utility does not come on to the road. The 20 kHz power output that does come on to the road has a relatively low fault current and is at a frequency where electric shocks to people are not possible. The system has several levels of insulation and three levels of isolation making it very safe.

Multiphase Construction for Wide Lateral Tolerance Using a Time Varying Rotating Field.

In an alternative embodiment for the roadway and in order to given wider lateral tolerance when driving along a highway, two or more power supplies can be used each rated between 70-100 kW and preferentially spaced at regular intervals 200 m apart. Each supply is connected to a three phase utility supply at 50/60 Hz 400/480 V per phase and drives approximately 100 meters. Here again each supply is designed to drive a current of approximately 125 A at a frequency of 20 kHz in an unbroken track loop. In this second embodiment however, the output of each power supply is synchronised (with the other supplies at each defined location), and controlled to ensure the phase of the output current has a predefined separation. In one embodiment only a two phase system is desired to minimise the number of supplies/tracks and controllers, and would then require the current in each transmission line to be controlled to be 90 degrees out of phase. If in some embodiments a three phase system were found to be desirable, then three power supplies and three transmission lines may be provided with the output currents of each synchronised in both frequency and phase where the phase of each current is controlled to be separated by 120 degrees.

Figure 35:
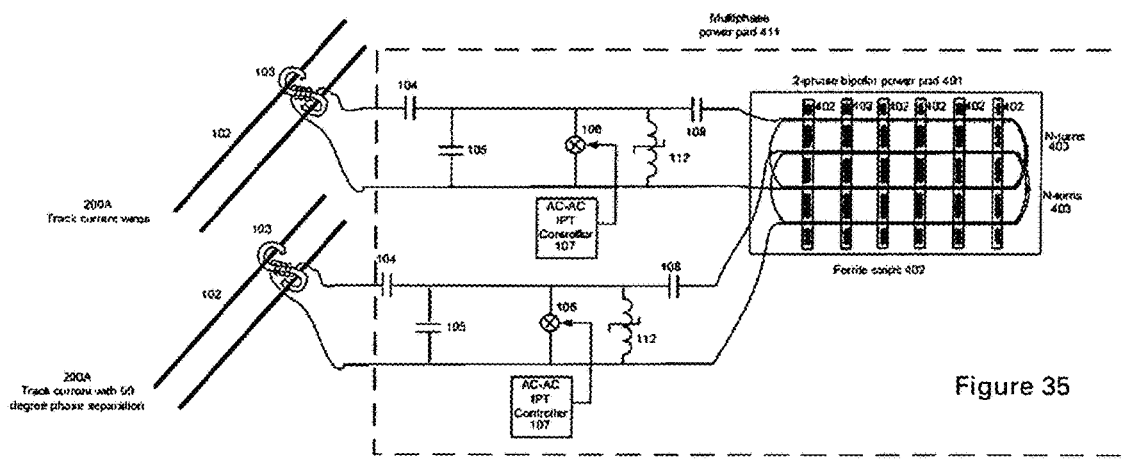
FIG. 35 is a diagram of a multiphase system according to one embodiment of the invention.

As in the previous embodiment, power modules 411 are inductively coupled to each transmission system 102 as shown in FIG. 35. In the case of a two phase system (as preferred here) the coil and ferrite arrangement 401 of the power module 411 comprises two phase winding inductances (403) each having identical N turns made of Litz wire which are spaced and overlapped in bipolar fashion effectively resulting in four groups of wires spaced 0, +90, +180 and +270 degrees electrically. In the embodiment illustrated the four groups of wires are aligned transversely across the roadway i.e. in a direction from one side to the other. However, the groups of wires may in another, less preferred, embodiment be directed longitudinally along the roadway i.e. parallel to the direction of travel along the roadway. Ferrite strips 402, made by using pieces of ferrite placed end on end, are placed across the back of the power module upon which coils 403 are laid. The ferrite acts to both short circuit any other potential flux paths in the roadway while also enhancing the flux above the road, in a similar manner to that described above in relation to FIGS. 15-34 and for the single phase power transfer module 109 shown in FIGS. 2A and 2B.

Each phase winding 403 within module part 401 is driven from its own control circuit comprising an appropriate pick-up (inductively coupled and driven from one of the transmission wires), tuning and AC controller as described above for the single phase embodiment. The module 411 may in some embodiments simply comprise part 401, the control and tuning elements being provided separately. Also, in an alternative embodiment, part 401 may be directly connected to a power supply i.e. not be inductively coupled to the phase separated power supplies.

In operation of the embodiment shown in FIG. 35 the AC controllers drive identical tuned voltages across each circuit's parallel tuned capacitors 105. In one embodiment the multiphase module can be constructed to be nominally 0.75 m to 1.5 m wide, and have a length between 0.5 m to 2 m (although 5 m long sections or larger may be suitable for some applications) the depth of such a module is also expected to be 40-150 mm depending on whether it is included in a roadway unit as described above in relation to the single phase embodiment. Such a roadway module or unit would preferably be positioned along the highway centre, but in some applications could be placed across a complete lane.

Further embodiments of multiphase bipolar power pad constructions will now be described with reference to FIGS. 40 to 48. Although the general pad construction is similar to that described in FIGS. 31A and 31B, different reference numerals are used for clarity of description.

Referring to FIG. 40, a magnetic flux pad construction is shown. For convenience, this general construction is referred to herein as a DDP pad, and is generally referenced DDP where appropriate in connection with the drawing FIGS. 40 to 48.

The DDP pad shown in FIG. 40 generally comprises two substantially coplanar coils referenced 802 and 803 which are magnetically associated with and sit on top of, a core 804. As can be seen from the drawing figure, the core 804 may consist of a plurality of individual lengths of permeable material such as ferrite strips or bars 805 which are arranged parallel to each other but spaced apart. The pad construction may include a plate 806 on which the core is located, and a lower spacer 807 below the plate. In some embodiments a cover 808 may be provided on the other surface of the flat coils 802 and 803. Padding 809 may be provided about the periphery of the pad. As can be seen, the coils 802 and 803 each define a pole area 810 and 811 respectively. We found that this DDP pad construction as shown in FIG. 40 shows very good characteristics suitable for IPT power transfer applications such as vehicle charging. The coils 802, 803 may be connected out of phase and driven by a single inverter to produce a stationary time varying magnetic field to couple to a receiver (which may for example be of substantially the same magnetic design) at distances suitable for electric vehicle power transfer with good coupling.

Turning now to FIG. 41, the DDP construction of FIG. 40 is shown but further including a quadrature coil 812 which is referred to as appropriate in connection with FIGS. 39 to 48 as a DDPQ pad. As described above, a quadrature coil extends the power transfer profile when there is lateral movement of the construction shown in FIG. 41 with respect to a flux generator such as the DDP pad of FIG. 40 when energised by an appropriate inverter. The quadrature coil allows power to be extracted from the "vertical" component of the magnetic field that the receiver pad intercepts while the other coils 802, 803 facilitate power extraction from the "horizontal" component of the flux intercepted. Therefore, the construction of FIG. 41 is suited as a flux receiver.

Turning now to FIG. 42, another construction is shown which is referred to in this document as a bi-polar pad or, alternatively, as a BPP pad. The BPP pad has a similar construction to the DDP pad discussed with respect to FIGS. 40 and 41 above as it enables excellent coupling to secondary receivers at distances suitable for charging and powering of electric vehicles.

The pad BPP consists, from bottom up, of an aluminium plate 807, a dielectric spacer 806, a core 804 comprising four rows of ferrite bars 805 (referred to herein as ferrites), two flat substantially coplanar, yet overlapping and ideally "rectangular" shaped coils 802, 803 (although in practice these are more oval due to the ease in winding Litz wire) spread out in the lateral direction, and a dielectric cover 808. The BPP is shown in FIG. 42, and Table A1 defines the actual dimensions investigated in simulation and for one experimental prototype.

The magnetic structure of the BPP is designed so that there is substantially no mutual coupling between either of the coils 802, 803 in the primary, as described later. This allows the coils to be driven independently at any magnitude or phase without coupling voltage into each other which if present would oppose the power output of such a coil.

In one mode of operation, the two coils within the BPP can be driven using two separate but synchronised inverters operating with known current magnitude and phase difference. If the coils are completely magnetically decoupled ideally there will be no power transfer between the primary inverters to limit power transfer to the secondary receiver.

In one embodiment the two inverters are synchronised but operated so as to produce currents with the same RMS magnitude, but operating 90 degrees out of phase in each of the coils 802, 803. (In a stationary application this would likely be two H bridge inverters with LCL structures tuned to resonance at the desired operating frequency the last L in each case being partially constructed using the pad inductance, where the primary inverters preferably have a common DC bus to simplify the input electronics from the mains. By having a 90° phase separation between the currents in the coils 802, 803, a spatially varying and time varying magnetic field is created rather than the stationary time varying magnetic field of the DDP. This is shown in FIG. 46 in which the left column represents a DDP pad and the right column represents a BPP pad. The spatial variation in the field of the BPP and appears as a sliding movement in alternate directions between the poles of the coils 802, 803.

It should be noted that other phase and magnitudes variations could be used to shape the field if there is a need to reduce the field emissions on one side of the transmitter to avoid leakage during operation due to offset nature of the coupled receiver, for example to meet ICNIRP regulations. Thus the field may be directed in response to the output of a sensor for example. Also, the field strength may be time varying but spatially stationary dependent on where across the pad the field is required.

In a further embodiment it is also possible to operate the coils 802, 803 180 degrees out of phase so that they can be simply connected to one inverter (as in the DDP operation). This particular single phase operating mode is a second possible mode of operation to simplify the electronic control and power conversion that will produce a stationary time varying field as for the DDP.

As a means of comparison, the power transfer profile of a BPP with a sliding time varying magnetic field is evaluated against the power transfer profile of a DDP magnetic structure driven from a single phase primary supply at identical current and frequency (the dimensions of which are defined in Table A2.). Both systems are evaluated under identical conditions being coupled to an identical DDQP receiver (i.e. a DDP pad including a quadrative coil such as that of FIG. 41 used as a flux receiver) at identical height and offsets (the dimensions of which are defined in Table A3).

Given the BPP creates what may be termed a sliding time varying magnetic field it is desirable to determine the preferred length of the four ferrite strips 805 used in its base above which the coils 802, 803 are placed. As in the known DDP these ferrite strips 805 are used to enhance the power transfer and ensure that a predominately single sided flux field is created to best couple to the secondary power receiver, while ensuring that a minimal amount of ferrite is used to keep weight to a minimum and restrict the inductance of the pad. In such a sliding field it is shown that the ferrite strips should preferably extend under the winding coils otherwise the field may not be forced upwards towards the receiver.

In this evaluation the ferrite strips 805 were constructed using readily available, slabs that are each a standard length of 93 mm. Each strip was conveniently chosen to be multiples of this length. Configurations with six (558 mm), eight (744 mm) and ten (930 mm) slabs lumped together were investigated. In all designs (apart from the 10 slab ferrite configuration) the external dimensions of the pad size of the BPP are identical to the DDP enabling a fair comparison. The ten piece ferrite configuration however forces the overall length (in the x direction) of the transmitter (or generator) pad to be increased beyond the standard length by 200 mm (compared to all other pads including the DDP configurations compared) and therefore is only included in evaluations to consider the impact of extensions to the ferrite beyond the coil dimensions. As indicated in Table A1 the distance between the ends of the two coils in all three BPP setups is identical although the overlap between the coils is set to that required to avoid mutual coupling arising between the primary coils.

When the two primary coils 802, 803 of the BPP are placed with an arbitrary overlap with respect to each other, there will be a mutual coupling between the coils. However for a certain ratio of overlap to coil width, denoted $r_o$, this mutual coupling is almost zero. The ideal overlap required to ensure no mutual coupling exists between each primary coil is not simple due the presence of the ferrite but can be determined by simply fixing one coil and energising this with a predetermined current at fixed frequency (either via a suitable 3D simulator or using a suitable experimental setup, for example). The open circuit voltage induced in the second primary coil can then be measured. If the second coil is moved so as to change the overlap there will be a change in coupled voltage. When this is minimised (ideally zero) the ideal configuration can be set. As shown in FIG. 43, the optimal overlap is dependent on the length of the ferrite strips underneath the coils. For the six, eight and ten piece ferrite pad the overlapping ratio, $r_0$ was found to be 0.53, 0.34 and 0.25 respectively.

The finite element solver JMAG Studio™ version 10.0 was used to simulate all proposed magnetic structures. Validation of the simulator outputs was confirmed by constructing a prototype BPP in the laboratory using ferrite strips comprised of six ferrite slabs in the base and compared against simulations. This scaled model used the external dimensions of table A1 for the BPP but simplified coils with only ten turns each to simplify the construction. The receiver was a DDQP as described in table A3. The comparison between measurement and simulation of FIG. 44 shows excellent correlation.

The power profiles given here are the total uncompensated VA power output which is determined using separate measurements of the receiver open circuit voltage ($V_{oc}$) and short circuit current ($I_{sc}$). The uncompensated VA is a well known measure of the power performance of a pad given by $S_u = V_{oc} * I_{sc}$. The DDQP receiver has two sets of coils, the coils 802, 803 (assuming they are in series) and the quadrature (Q) coil 812. In this case the uncompensated power is found for both sets of coils separately and the total uncompensated power available from the pickup is referred to as the total power which is simply calculated as the sum of the power from the two sets of coils. It is this total power which underlies the power transfer profile.

The power transfer profile of each BPP design can therefore be confidently determined using 3D simulation and is shown in FIG. 45. Here the BPP is excited with a 20 kHz current with 23 A rms while the receiver is the DDQP. The parameters governing their relative position are referred to as the offset distances, in Cartesian coordinates, that is: $x_{os}$ (lateral), $y_{os}$ (longitudinal) and $z_{os}$ (vertical). The configuration of the two pads lying on top of each other with their dielectric covers 808 touching is (0,0,0). The vertical offset $z_{os}$ is 200 mm.

Notably there is a significant increase in power when the ferrite under the coils is extended, and it is clear that the ferrite should extend at least under the entire coil 802, 803 (BPP with eight ferrite slabs). The reason for the drastic increase in uncompensated power from the BPP as ferrite is added to its base, lies in the non-stationary nature of its magnetic field. The field close to the BPP pad can best be described as a sliding wave across the surface, unlike the DDP which pulsates up and down due to its single phase nature. This sliding nature, and fundamental difference, between the BPP and the single phased DDP, is clearly evident in FIG. 46, where the magnetic flux density is compared phase by phase for half a period. In FIG. 46 field plots of both the BPP8 and DDP coupling to a DDQP receiver are shown, at various instances in time over a full cycle of the primary resonant current. From top to bottom shows 0, 30, 60, 90, 120 and 150 degrees (where in the bipolar the other phase is operated with 90 degree separation). The plots in the left column are for a BPP pad with 8 ferrite slabs. The plots in the right column are for a DDP pad. The flux from the single phase DDP pad pulsates up and down, having a very strong and confined flux centred over the pad, whereas the BPP has a more constant flux patternwise, but this pattern shifts over the surface of the pad like a sliding wave as the phase advances.

The sliding wave of the BPP gives rise to very localised high flux on the edge of pad, whereas the DDP pad keeps the strong flux in the centre of the pad. In the six piece version there is no ferrite under the ends of the coils, and the flux is not contained well enough by the dielectric filling material 806 (wood). It is therefore not radiated upwards, but rather inducing eddy currents in the aluminium base plate 807 of the pad. In FIG. 47 the three setups are compared for the same phase. FIG. 47 shows field plots for a BPP pad with six (top), eight (middle) and ten (bottom) slabs making up each ferrite strip in the base, in the presence of a vertical offset DDQP receiver at 0 degrees. The flux density appears qualitatively different, especially around the right edge where the flux density is high for the eight and ten ferrite setups, but not for the six ferrite setup. In the ten ferrite version, the flux is even better confined, with less of the field "wrapping around" the side of the track pad, again a factor responsible for decreasing the power transfer, since the field will not be pushed towards the pickup (i.e. the receiver pad) as desired.

The BPP with the eight ferrite slabs in each ferrite base strip (BPP8) is compared to the DDP in FIG. 48. The power transfer profile of the BPP8 compared against the profile of the DDP reveals the very evident differences in shape and maximum. As configured, the BPP8 yields around 70% of the DDP's maximum power and has similar power profile shapes. The power levels shown and coupling achieved is however sufficient to deliver suitable levels of power to an electric vehicle for example, at distances required for practical application and furthermore do not exhibit as significant a rate of change of variation of power around the peak with offset as that seen in the DDP power profile. This limited rate of charge of power is an advantage when considering power highway applications given there will not be severe fluctuations in power with lateral movement.

TABLE A1

Dimensions of the BPP

| Common Dimensions | |
|---|---|
| Winding width | 80 mm |
| Ferrite spacing | 32 mm |
| Ferrite width | 28 mm |
| Y coil spacing | 50 mm |
| Y padding | 46 mm |
| Cover thickness | 6 mm |
| Coil height | 4 mm |
| Ferrite height | 16 mm |
| Spacer thickness | 6 mm |
| Plate thickness | 4 mm |
| Variations based on number of ferrites | |
| A: BBP6: using 6 ferrite slabs to make each ferrite strip | |
| (BPP6) Ferrite length | 558 mm |
| (BBP6) Overlap | 156 mm |
| X coil spacing | 10 mm |
| X padding | 10 mm |
| B: BBP8: using 8 ferrite slabs to make each ferrite strip | |
| Ferrite length | 774 mm |
| Overlap | 74 mm |
| X coil spacing | −83 mm (− represents an overlap) |
| X padding | 10 mm |
| C: BBP10: using 10 ferrite slabs to make each ferrite strip | |
| Ferrite length | 930 mm |
| Overlap | 39 mm |
| X coil spacing | −174 mm (− represents an overlap) |
| X padding | 110 mm (nb: 200 mm added overall to padding to fit extra ferrites) |

TABLE A2

Dimensions of the DDP

| | |
|---|---|
| Winding width | 80 mm |
| Inner winding width | 120 mm |
| Ferrite spacing | 32 mm |
| Ferrite width | 28 mm |
| Y coil spacing | 10 mm |
| Y padding | 46 mm |
| Cover thickness | 6 mm |
| Coil height | 4 mm |
| Ferrite height | 16 mm |
| Spacer thickness | 6 mm |
| Plate thickness | 4 mm |
| Ferrite length | 558 mm |
| X coil spacing | 10 mm |
| X padding | 10 mm |

TABLE A3

Dimensions of the DDQP

| | |
|---|---|
| Winding width | 80 mm |
| Inner winding width | 120 mm |
| Ferrite spacing | 32 mm |
| Ferrite width | 28 mm |
| Y coil spacing | 10 mm |
| Y padding | 46 mm |
| Cover thickness | 6 mm |
| Coil height | 4 mm |
| Ferrite height | 16 mm |
| Spacer thickness | 6 mm |
| Plate thickness | 4 mm |
| Ferrite length | 558 mm |
| X coil spacing | 10 mm |
| X padding | 10 mm |
| Quadrature coil length | 534 mm |

Figure 39A:
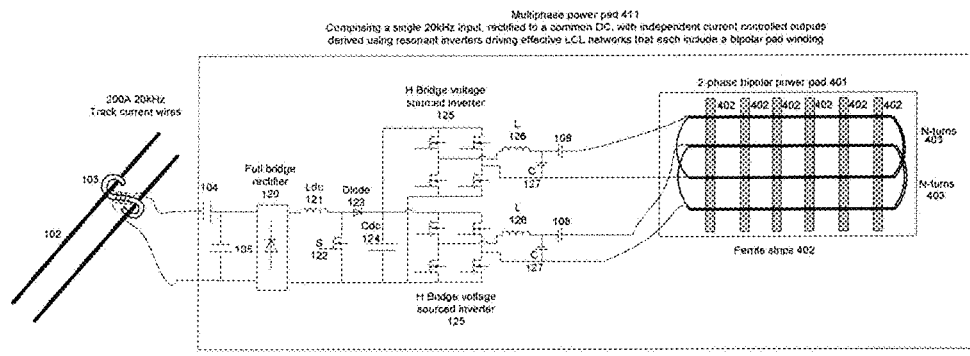
FIG. 39A is a circuit diagram showing an embodiment for a bipolar pad.

In an alternative and preferred embodiment, bipolar pad 401 or other similar multiphase construction can be driven at higher frequency using one or more high frequency power supplies coupled to a single track 102 operating at 20 kHz. FIG. 39A shows one possible embodiment for a bipolar pad 401 where power is coupled at 20 kHz from track 102 using receiver 103 and tuned using capacitors 104 and 105. This parallel resonant circuit is then input to a rectifier which controls the voltage across capacitor 124 using DC inductor 121, diode 123 and decoupling switch 122. The DC voltage across capacitor 124 is then switched using two standard resonant inverters 125 operating at 140 kHz, each driving an LCL converter resonant at 140 kHz comprising elements 126, 127, 108 and inductor 403 within the bipolar pad. Each inverter 125 would preferably be synchronized to drive current in the separate bipolar pad windings with 90 degrees phase shift as described earlier, although if required can vary the magnitude and or phase to suit.

If the windings of the bipolar pad are connected in series then it is also possible to operate this using a single inverter of the form shown in FIG. 39B to produce a single phase time varying field suitable for power coupling.

Those skilled in the art will appreciate that using the topology shown in FIG. 39A allows a multiphase flux transmission pad or module to be provided without the expense of laying (and powering) more than one primary loop 102 along the roadway. Thus the topology is beneficial even if no frequency change is adopted.

The Vehicle Side

On the vehicle (as shown in FIG. 36) in one embodiment one or more oval shaped power modules 504, with their major dimension, being their width, across the road, are bolted or otherwise attached to the underside of the vehicle and pick up power inductively from the magnetic field generated by the single phase power modules 111 or multiphase power modules 411 (FIG. 35). The module 504 may be provided as an integral part of the vehicle. In another embodiment the module 504 may be provided such that its major dimension extends in the direction of travel of the vehicle, i.e. longitudinally aligned with the roadway.

The power received by power reception module 504 is then processed by an on-board controller 505 whose power demand is regulated by a master power controller 506 and used to maintain the batteries 507 on board the vehicle at a high state of charge. One or more electric motors on the vehicle take power from the battery to drive the vehicle. While the vehicle straddles the power modules the battery or batteries are easily maintained at essentially full charge, but the vehicle can go to other lanes to pass slower traffic or it can go off the inductive power roadway to a minor road where it is powered completely from the battery for as long as the battery can deliver the required power. Some battery management is required but in essence if the vehicle can make it back to the powered roadway then it can drive as required and over time its batteries will be fully recharged.

In the operation of the complete system the power modules only produce magnetic fields when a vehicle is over them at a field strength (power level) appropriate to the particular vehicle or vehicle category—at other times they are shut down by controller 107 (FIGS. 1 and 2) or by having their power supply (101) turned off, and there is no magnetic field, present. For example, as a vehicle nears a power module an RFID tag (502) or other communication means can be used to tell the module controller in the roadway to turn on at the desired power level. A sensor 501 or communications receiver can be added within power module (111) to receive the required information and inform the controller. The power modules will either be turned off using a similar RFID tag or communications device (503) at the rear of the vehicle or after a certain elapsed time.

In this embodiment each vehicle picks up power in proportion to the number of receiver modules that are situated underneath it, and the strength of the field from each roadway power module that each receiver is coupled to. If for example a receiver module that is capable of taking between 4-8 kW depending on the field from the transmitter module is placed under a vehicle then small vehicles with two such receiver modules may receive power between 8-16 kW while moving, whereas larger vehicles with four power modules may receive power at 16-32 kW while moving. Very large buses may receive power at in excess of 60 kW. At a speed of 55 mph (88 km/h) the power demand from a typical passenger car is approximately 220 WH/mile so that to maintain the battery charge requires a power of 12.1 kW. In these circumstances a vehicle equipped with two receiver modules will be able to drive and still charge at a 3.9 kW rate if the maximum, power is demanded from each roadway power module. In consequence a vehicle battery's charge can be replaced while it is moving along the roadway. Smaller vehicles may require less power on average, and therefore demand a lower power rate from the transmitter modules while still coupling sufficient to charge the batteries on board. As noted, in one embodiment the power modules are approximately 500 mm long (in the direction along the highway) and can be positioned relatively closely together so that four power modules enabling up to 32 kW output can easily fit under a 4 m long vehicle. Thus the invention can provide high roadway power densities. The coils in the modules (both transmission and/or reception modules) may extend over greater (or lesser) distances than the 500 mm referred to above in the longitudinal direction. The transverse (width dimension) of the modules will typically be determined, at least in part, by the width of the vehicles that use the roadway. Coils that are longer in the longitudinal direction tend to increase coupling, but shorter longitudinal coil dimensions mean that there is more flexibility in terms of excitation of the coils for vehicles (especially different sizes of vehicle).

In one embodiment, as a vehicle moves along the road, transmitter power modules keep switching on and off in synchronism with its movement, so that there is always power available for the vehicle, but the system losses are minimised. The transmission efficiency from the utility to the battery terminals is expected to exceed 75%. Note that in one embodiment the complete system is completely modular—all the transmission power modules and receiver power modules are respectively identical and a larger system simply uses more of the same. In practice the receiver power modules under the vehicle can be used with either a multiphase or single phase transmission power module array in the roadway.

At any point in time any particular power supply 101 may have a number of vehicles that it is driving. Under normal operation vehicles will normally drive with sufficient spacing (approximately 50 m apart at 55 mph (88 km/hr) assuming vehicles are separated with two seconds between vehicles). In consequence during such normal operation clusters of power transmission modules will be activated under each vehicle but no more than two vehicles would be on a 100 m stretch of highway at one time. At slower speeds the level of traffic will increase so that in the case of severe traffic congestion where for example vehicles may be parked end to end, there could be as many as 20 vehicles on a 100 m length of road each requesting charge and power for auxiliaries but not requiring any significant power for the drive motor. Under such conditions the RFID tag or similar device at the front of each vehicle will activate only a single power module and all other modules will be inactive because they will have either been turned off using the RFID tag at the rear of the vehicle or automatically after a certain elapsed time. In consequence under such worst case traffic congestion only every $10^{th}$ power transmission module along a roadway section will be activated (assuming power modules are stacked along the highway 1 per 0.5 m) and power can be controlled to supply around 5 kW to each vehicle (enabling power to on-board auxiliaries plus suitable charge rates as required by the batteries). In longer vehicles such as trucks/buses, more than one RFID tag could be used to enable two (or more) modules to be activated as required for higher charge rates.

If the number of vehicles powered by each supply is known then an optimisation program may be run to distribute the 100 kW of power available in the best possible way. For example if 5 trucks all demanding 50 kW are on the 100 m they cannot all be charged but they could all be partially charged by reducing the charging rate to each vehicle to 20 kW or by charging any two at full power depending on which vehicles have the least charge in their batteries. This optimisation is very sophisticated and allows the IPT losses to be minimised while charging the load mix in the best possible way. Thus in one embodiment the controllers 107 form part of a larger control arrangement (not shown). For example, a controller may be associated with each power supply (i.e. each 100 m loop), receiving information as to the number of vehicles, and category of each vehicle, on the roadway section. That controller can then implement a control strategy to instruct controllers 107 to activate in a manner such that the available power is effectively distributed. Those skilled in the art will appreciate that the controller (and/or controllers 107) may communicate or at least receive information from the vehicles on the roadway as to their power requirements. For example the controller could supply more power to a vehicle that indicates it has a very low battery charge condition, or to an emergency services vehicle.

Vehicle Power Control

The power control on the vehicle side is achieved as shown in FIG. 37 and uses an AC controller 505. This form of controller may be of substantially the same topology or operating principle as the controller described earlier in this document as controller 107

In one embodiment the structure of the receiver module is as described above in relation to the power transfer modules. The two coupled windings (110A and 110B) of FIG. 37A preferably are added in series (but may alternatively be connected in parallel) to produce an output that is compensated using one or more capacitors to be resonant at the frequency of the power supply. A suitable decoupling controller which can be controlled to provide the required power to charge a battery on board a vehicle is used, such as that described in U.S. Pat. No. 5,293,308 the contents of which are included herein by reference. While in some applications it may be possible to use any of the decoupling controllers for power control, in a preferred embodiment AC controller 604 is used for this purpose as this circuit has minimal switching loss during operation and it also enables the voltage across the resonant tuning capacitor 602 to be directly controlled. Controller 604 is equivalent to controller 505 referred to with respect to FIG. 36. Thus power control to the battery can be accurately and safely regulated despite variations in mutual coupling between the transmitter module in the roadway and the receiver module in the vehicle as a result of misalignment with respect to the centre line of a lane due to movement while driving, and also due to variations in separation between the roadway surface and the underside of the vehicle due to on fluctuations in board weight, height of the vehicle or imperfections in the roadway surface. Such a controller is shown in FIG. 37A. Capacitors 601 and 602 are used together with coil 110A and 110B to design the output current and voltage of the tuned system. Switch 603 is controlled using controller 604 to vary the voltage across 602. Saturable inductor 605 is used for over-voltage protection in case of transient surges above the normal operating range. The controlled AC voltages are rectified using 606 and filtered using inductor 607 before being output to the battery. As described earlier the battery management system can communicate with the controller 604 to request variation in the current and voltage to the battery terminals using standard communications protocols such as CAN bus. Thus the vehicle power controller controls the quantity of power received by the vehicle dependent on the power available to the vehicle, the instantaneous power requirements of the vehicle, and the state of charge of a battery associated with the vehicle.

In a second embodiment a third coil may be added to the vehicle module in quadrature with the other coils, the structure of which is described above with reference to FIGS. 15 to 35. The purpose of this third coil is to provide additional lateral tolerance to vehicle movement during driving or for stationary alignment at known charging points. As shown in FIG. 37B a separate controller 604 can be used to separately regulate the power output from this quadrature coil 101C. The combination of both circuits significantly enhances the lateral tolerance of the vehicle module to any movement from the centre line as indicated from the uncompensated power profile of the horizontal field coils 101A and 101B (blue) and vertical field coil 101C (green) shown in FIG. 38A.

During operation the controller 604 on the quadrature coil is kept in a short circuit (decoupled) condition and remains unused until the short circuit current is shown to be sufficiently high (above a predefined threshold) that it will provide power. In consequence any losses that might otherwise occur from resonant currents circulating in the tuned AC resonant circuit are essentially eliminated until power is available to be drawn from the circuit. In regions where the horizontal coils (101A and 101B) are found to contribute little or no power, this controller can also be decoupled from the circuit thereby ensuring that the efficiency of the power control is maintained high. This power control is shown in concept in FIG. 38B.

Referring again to FIG. 37B, it may also be desirable to operate a decoupling switch at the output of DC inductor 607 and to diode connect the output to the battery. Under such operation, AC switch 603 is only required to decouple the horizontal or vertical flux receiver if the coupled power of the vehicle pad is too low to be able to couple power efficiently from that coil.

The selection of the receiver module on the vehicle side does not limit the choice of the roadway configuration. Either option as described above can be used with either the single phase roadway module as described in FIG. 1 or the multiphase system as described in FIG. 36. For multiphase roadway module systems the lateral tolerance of the receiving coil is already improved due to the nature of the rotating time varying fields produced above the roadway surface, however the addition of the quadrature coil on the vehicle module can also improve the power profile with misalignment. Here the combined power output of the receiver with both horizontal and quadrature coils is always superior to that of a receiver with just the horizontal coils, particularly if the quadrature coil diameter is chosen to be similar to the diameter of the phase coils in the roadway and in consequence if such a system is chosen it may be desirable to operate both outputs continuously independent of misalignment. In practice the best system option will need to be chosen based on a number of factors including cost, efficiency, complexity and weight, amongst others.

As mentioned above, the AC power transfer and control methods disclosed earlier in this document with reference to controller 107 may also be used to provide a DC output. The operation and advantages of this approach are now discussed further with reference to FIGS. 12 and 13. Most simply as shown in FIG. 12 a bridge rectifier and DC inductor may be added to give a DC output voltage while retaining the same characteristics as the AC output circuit. In these circumstances four extra diodes are needed for the bridge rectifier. In many applications this circuit has little or no advantage compared with a conventional IPT circuit with a decoupling controller on the DC side of the circuit but there is one particular application where this circuit is highly beneficial. In the charging of electric vehicles across a large air gap a design objective might be to achieve an output power of perhaps 2 kW across a large air gap. A problem now arises if the air gap is significantly reduced so that the coupled voltage may be much larger than when operating under normal conditions. Such variations must be expected—for example the vehicle might have a flat tyre or it may be under repair with the receiving module (i.e. the pick-up coil arrangement) parked on top of the floor module (the primary coil arrangement connected to a power supply) to charge the battery. Here the induced open circuit voltage may be 3-4 times larger than the normal value and the short-circuit current of the pick-up coil will likewise be 3-4 times larger. The disclosed circuit can be turned down by changing the angle θ to a value approaching 120 degrees to control the power flow to one that can be sustained by the power supply of the system. The current in the pick-up coil, the voltage across the tuning capacitors, and the current in the rectifier and the DC inductor all remain essentially at their rated values and there is no damage incurred. However with a conventional controller (such as that disclosed in U.S. Pat. No. 5,293,308) the short circuit current would be 3-4 times larger and this current would flow through the rectifier, DC inductor, and the switch and would significantly stress these components. To increase the current ratings of these devices by four times may not be a practical proposition as the physical size of the DC inductor in the circuit will be greatly increased.

The circuit of FIG. 12 may also be redrawn as in FIG. 13 where the rectifier now works in conjunction with the switches and only two extra diodes are needed instead of a diode bridge. This circuit allows the use of the inverse parallel diodes in the MOSFETS so that the diode count can be reduced to be the same as in the original AC circuit. Note that the diodes in the MOSFETs switch the resonating current which may be quite large while the other diodes switch the DC output current which is a lot smaller so that the two extra diodes are much smaller than the diodes in the conceptual circuit of FIG. 5. As shown this circuit can have a DC and an AC output at the same time but these are not independently controllable. They do however provide a reference that may be grounded (as shown) so that both switches can be driven from a common low voltage power supply.

Stationary Charging

The system as described is not limited to powering a vehicle while moving along a highway. Suitable power modules can be placed alongside a roadway in any parking location such as a garage at home or at work, or any open parking location. In such applications only one power module may be required which can be powered from a smaller resonant supply connected to either single or three phase mains depending on the power demand required. For such stationary charging systems, a double coupled system as described in FIG. 1 may be unnecessary. Instead a small power supply may be used to directly energise and control the field from a single power module on the ground.

In home based charging systems a low cost charging system is likely preferred and with the potential deployment of many thousands of vehicles around a city charging systems between 2-5 kW is likely to be preferred by energy providers, and will meet the charging needs of most consumers when combined with the highway charge system described.

Thus in practice, most households will utilise a single phase mains charging system to provide around 2 kW to a stationary vehicle and this can be used to deliver charge as soon as a vehicle parks above the module with suitable alignment. In areas where three phase mains is available, 5 kW or higher charging stations can be created, simply by using a larger power supply and a ground based transmitter module designed to provide this power level. The electronics and receiver modules on board the vehicle are compatible with either system and can (using suitable communications means) request a lower power level from the roadway stationary charging system based on pricing or demand where higher power is available than required. Independent of the available power the on-board power controller will regulate the power delivered so that only that power which can be accepted by the battery will be provided for charging.

Bus Stops, Taxi Stops and Traffic Lights

The roadway based system can be used ideally in taxi or bus stops to increase the energy delivered to the battery and ensure dwell times are minimised. Power modules can be placed along the entire length of a bus stop/taxi stand or may be situated in a dedicated lane for either buses or taxis. Both buses and taxis can be charged while moving slowly (queuing for an available space to stop) or while they are stationary anywhere along this powered lane. As described, only the power modules in the roadway directly beneath the vehicle will be activated at a power level suitable for the power demands required.

The invention claimed is:

1. An electric vehicle inductive power system for use with a primary conductive path associated with a roadway over which a vehicle may travel, the inductive power system comprising:
a plurality of power transmission modules adapted to be placed in or on the roadway relative to the primary conductive path so as to be inductively coupled to the primary conductive path, the power transmission modules wirelessly receiving power from the primary conductive path, each power transmission module comprising a first coil for receiving power wirelessly at a first frequency from the primary conductive path, and a second coil operable to supply power wirelessly at a second frequency which is different than the first frequency to at least one electric vehicle when the at least one electric vehicle is on the roadway and sufficiently near the power transmission module to receive power therefrom.

2. An electric vehicle inductive power system as claimed in claim 1 wherein the primary conductive path is energized at the first frequency and the second coil of each power transmission module is energized at the second frequency.

3. An electric vehicle inductive power system as claimed in claim 2 wherein the second frequency is greater than the first frequency.

4. An electric vehicle inductive power system as claimed in claim 2 wherein the second frequency is the same as the first frequency.

5. An electric vehicle inductive power system as claimed in claim 1 further comprising a controller provided for each power transmission module to selectively allow each power transmission module to make inductive power available to the at least one electric vehicle when the at least one electric vehicle is sufficiently near the power transmission module to receive power therefrom.

6. An electric vehicle inductive power system as claimed in claim 5 wherein the controller controls a quantity of power available to the at least one electric vehicle.

7. An electric vehicle inductive power system as claimed in claim 6 wherein the quantity of power available is determined based on a power demand category of the at least one electric vehicle to which power is being supplied.

8. An electric vehicle inductive power system as claimed in claim 7 wherein the quantity of power available is determined based on a type of the at least one electric vehicle to which power is being supplied.

9. An electric vehicle inductive power system as claimed in claim 6 wherein the quantity of power available is determined based on a type of the at least one electric vehicle to which power is being supplied.

10. An electric vehicle inductive power system as claimed in claim 6 wherein the controller controls the quantity of power available to each of the at least one electric vehicle dependent on a number of vehicles on a section of the roadway.

11. An electric vehicle inductive power system as claimed in claim 1 further comprising one or more coils provided in each power transmission module to provide a magnetic field for inductive power transfer to the at least one electric vehicle.

12. An electric vehicle inductive power system as claimed in claim 11 further comprising means to energize coils within a module or between modules in a phase relationship.

13. An electric vehicle inductive power system as claimed in claim 1 wherein the power transmission modules are tuned so that a section of the primary conductive path adjacent to each power transmission module has substantially compensated reactance.

14. An electric vehicle inductive power system as claimed in claim 1 wherein the primary conductive path is buried in or adjacent to the roadway.

15. An electric vehicle inductive power system as claimed in claim 1 wherein each power transmission module may be inductively coupled to the primary conductive path at multiple different locations along the primary conductive path.

16. An electric vehicle inductive power system comprising:
a plurality of power transmission modules in or on a vehicle surface, each power transmission module being capable of receiving power wirelessly at a first frequency and supplying power wirelessly at a second frequency which is different than the first frequency to at least one electric vehicle when the at least one electric vehicle is on the vehicle surface in a region of that power transmission module,
a controller to selectively allow each power transmission module to make inductive power available to the electric vehicle when the electric vehicle is sufficiently near the power transmission module to receive power therefrom and energize adjacent power transmission modules in phase.

17. An electric vehicle inductive power system comprising:
a plurality of power transmission modules in or on a vehicle surface, each power transmission module being capable of receiving power wirelessly at a first frequency and supplying power wirelessly at a second frequency which is different than the first frequency to at least one electric vehicle when the at least one electric vehicle is on the vehicle surface in a region of that power transmission module,
a controller to allow each power transmission module to vary a quantity of non-zero inductive power made available to the at least one electric vehicle when the at least one electric vehicle is sufficiently near the power transmission module to receive power therefrom.

18. An electric vehicle inductive power system as claimed in claim 17 wherein the controller controls the quantity of inductive power available to each electric vehicle dependent on a number of vehicles on a section of the vehicle surface.

19. An electric vehicle inductive power system as claimed in claim 17 wherein the controller controls the quantity of inductive power available to each electric vehicle dependent on a vehicle power requirement.

20. An electric vehicle inductive power system as claimed in claim 17 wherein the controller controls the quantity of inductive power available to each electric vehicle dependent on a vehicle category to which that vehicle belongs.

21. An electric vehicle inductive power system as claimed in claim 17 wherein the controller makes inductive power available from the or each power transmission module upon detection of a presence of the at least one electric vehicle in a region of the or each power transmission module.

22. An electric vehicle inductive power system as claimed in claim 21 wherein the controller makes inductive power available from the or each power transmission module for a predetermined maximum time period after detection of the presence of the at least one electric vehicle in the region of the or each power transmission module.

23. An electric vehicle inductive power system as claimed in claim 22 wherein the controller ceases to make inductive power available from the or each power transmission module upon detection of an absence of the at least one electric vehicle in the region of the or each power transmission module.

24. An electric vehicle inductive power system as claimed in claim 21 wherein the controller ceases to make inductive power available from the or each power transmission module upon detection of an absence of the at least one electric vehicle in the region of the or each power transmission module.

25. A method for powering electric vehicles inductively, the method comprising:
energizing a primary conductive path associated with a vehicle surface over which a vehicle may travel;
receiving power wirelessly from the primary conductive path at a first frequency; and
selectively energizing at least one of a plurality of power transmission modules in or on the vehicle surface at a second frequency which is different than the first frequency when the electric vehicle is on the vehicle surface and sufficiently near the power transmission module to receive power wirelessly therefrom.

26. A method as claimed in claim 25, wherein the second frequency is greater than the first frequency.

27. A method as claimed in claim 25 further comprising controlling a quantity of power available to the electric vehicle.

28. A method as claimed in claim 25 further comprising controlling a quantity of power available to the electric vehicle dependent on a power demand category of the electric vehicle to which power is being supplied.

29. A method as claimed in claim 25 further comprising controlling a quantity of power available to the electric vehicle dependent on a type of the electric vehicle to which power is being supplied.

30. A method as claimed in claim 25 further comprising controlling a quantity of power available to the electric vehicle dependent on a number of vehicles on a section of the vehicle surface.

31. A method as claimed in claim 25 further comprising tuning the power transmission modules whereby a section of the primary conductive path adjacent to each power transmission module has its reactance substantially compensated.

32. A method for powering vehicles wirelessly from a primary conductive path associated with a roadway over which a vehicle may travel, the method comprising:
providing a plurality of power transmission modules, each power transmission module being operable to supply power wirelessly at a second frequency to at least one vehicle when the at least one electric vehicle is on the roadway and sufficiently near the power transmission module to receive power therefrom; and
placing the power transmission modules in or on the roadway relative to the primary conductive path so as to wirelessly receive power at a first frequency from the primary conductive path, wherein the first frequency is different than the second frequency.

* * * * *